US010713480B2

(12) United States Patent
Fukazawa et al.

(10) Patent No.: US 10,713,480 B2
(45) Date of Patent: Jul. 14, 2020

(54) INFORMATION PROCESSING DEVICE AND INFORMATION PROCESSING METHOD

(71) Applicant: SONY CORPORATION, Tokyo (JP)

(72) Inventors: Ryo Fukazawa, Kanagawa (JP); Shunichi Kasahara, Kanagawa (JP); Osamu Shigeta, Tokyo (JP); Seiji Suzuki, Kanagawa (JP); Maki Mori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/390,485

(22) Filed: Apr. 22, 2019

(65) Prior Publication Data
US 2019/0244019 A1    Aug. 8, 2019

Related U.S. Application Data

(63) Continuation of application No. 14/386,120, filed as application No. PCT/JP2013/001868 on Mar. 19, 2013, now Pat. No. 10,303,936.

(30) Foreign Application Priority Data

Mar. 27, 2012 (JP) .................. 2012-071331

(51) Int. Cl.
*G06K 9/00* (2006.01)
*G01C 21/20* (2006.01)
(Continued)

(52) U.S. Cl.
CPC ......... *G06K 9/00369* (2013.01); *G01C 21/20* (2013.01); *G06F 3/011* (2013.01);
(Continued)

(58) Field of Classification Search
CPC .......... G06K 9/00369; G06K 9/00771; G06K 9/00919; G01C 21/20; G06F 3/011; H04N 5/23219
See application file for complete search history.

(56) References Cited

U.S. PATENT DOCUMENTS 8,457,879 B2   6/2013   Merkel et al.
2002/0049534 A1   4/2002   Yuda et al.
(Continued)

FOREIGN PATENT DOCUMENTS

DE   102007033391 A1   1/2009
EP        1195578 A2   4/2002
(Continued)

OTHER PUBLICATIONS

Notice of Allowance and Fees Due for U.S. Appl. No. 14/386,120, dated Jan. 17, 2019, 08 pages.
(Continued)

*Primary Examiner* — Nicholas G Giles
(74) *Attorney, Agent, or Firm* — Chip Law Group

(57) ABSTRACT

According to an illustrative embodiment, an information processing device is provided. The information processing device includes an image acquisition unit configured to receive an image; a recognition unit configured to acquire a recognition result of a user based on the received image, wherein the recognition result includes a position of the user, the user being associated with a display terminal; an image determination unit configured to determine an object based on the recognition result; and a display control unit configured to control display of the object on the display terminal.

11 Claims, 23 Drawing Sheets

(51) Int. Cl.
  *G06F 3/01* (2006.01)
  *H04N 5/232* (2006.01)
  *G07C 11/00* (2006.01)

(52) U.S. Cl.
  CPC ..... *G06K 9/00771* (2013.01); *G06K 9/00919* (2013.01); *H04N 5/23219* (2013.01); *G07C 11/00* (2013.01)

(56) References Cited

U.S. PATENT DOCUMENTS

| | | | |
|---|---|---|---|
| 2004/0051644 A1 | 3/2004 | Tamayama et al. | |
| 2006/0050933 A1 | 3/2006 | Adam et al. | |
| 2010/0153003 A1* | 6/2010 | Merkel | G01C 21/20 701/533 |
| 2010/0199232 A1* | 8/2010 | Mistry | G06F 1/163 715/863 |
| 2011/0057875 A1* | 3/2011 | Shigeta | G06F 3/011 345/156 |
| 2013/0076735 A1 | 3/2013 | Lee | |

FOREIGN PATENT DOCUMENTS

| | | |
|---|---|---|
| EP | 2171640 A1 | 4/2010 |
| JP | 2002-107161 A | 4/2002 |
| JP | 2004-153674 A | 5/2004 |
| WO | 2009/010345 A1 | 1/2009 |

OTHER PUBLICATIONS

Non-Final Rejection for U.S. Appl. No. 14/386,120, dated May 10, 2018, 09 pages.
Advisory Action for U.S. Appl. No. 14/386,120, dated Feb. 15, 2018, 02 pages.
Final Rejection for U.S. Appl. No. 14/386,120, dated Nov. 17, 2017, 09 pages.
Non-Final Rejection for U.S. Appl. No. 14/386,120, dated Apr. 7, 2017, 08 pages.
Advisory Action for U.S. Appl. No. 14/386,120, dated Dec. 12, 2016, 03 pages.
Final Rejection for U.S. Appl. No. 14/386,120, dated Sep. 9, 2016, 09 pages.
Non-Final Rejection for U.S. Appl. No. 14/386,120, dated Feb. 23, 2016, 11 pages.
International Search Report and Written Opinion of PCT Application No. PCT/JP2013/001868, dated Jun. 20, 2013, 14 pages of ISRWO.
International Preliminary Report on Patentability of PCT Application No. PCT/JP2013/001868, dated Oct. 9, 2014, 10 pages of IPRP.

* cited by examiner

[Fig. 1]
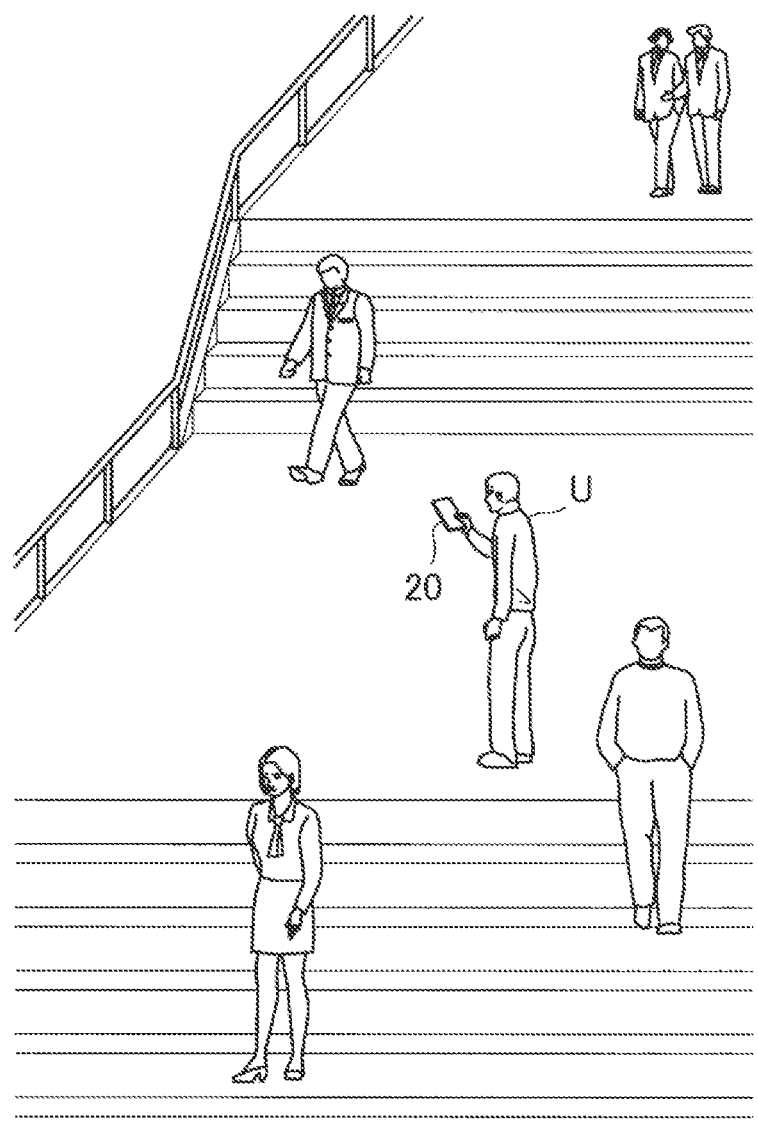

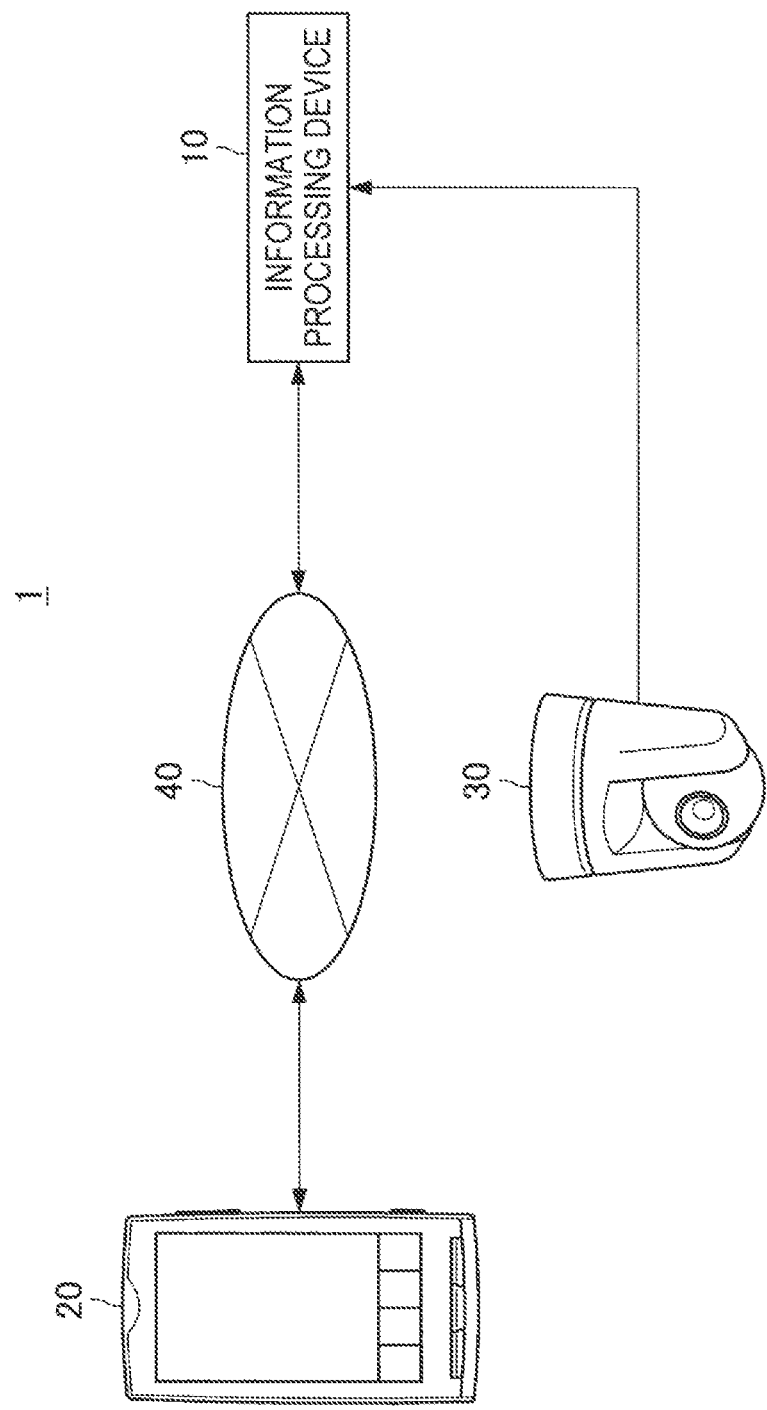
[Fig. 2]

[Fig. 3]
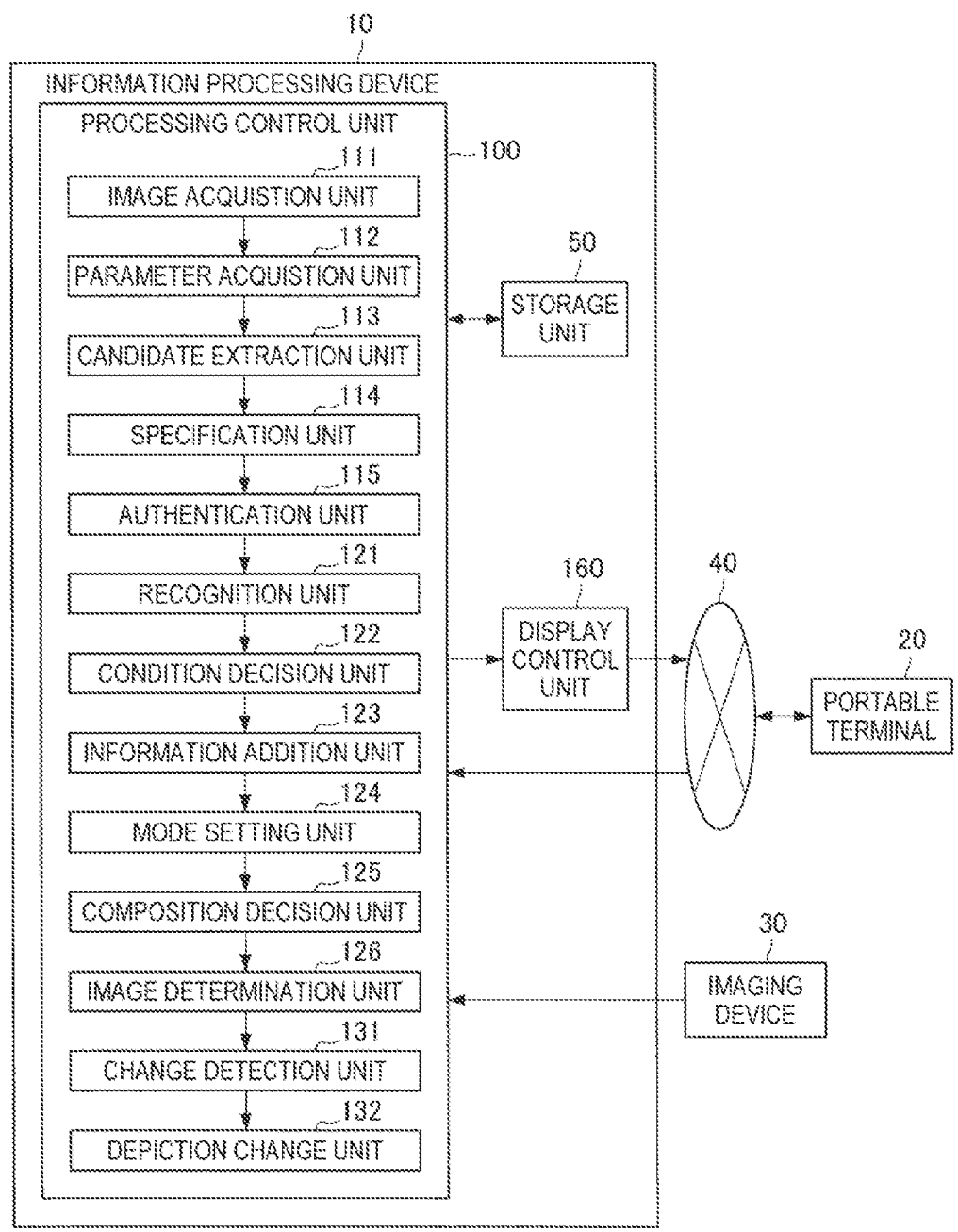

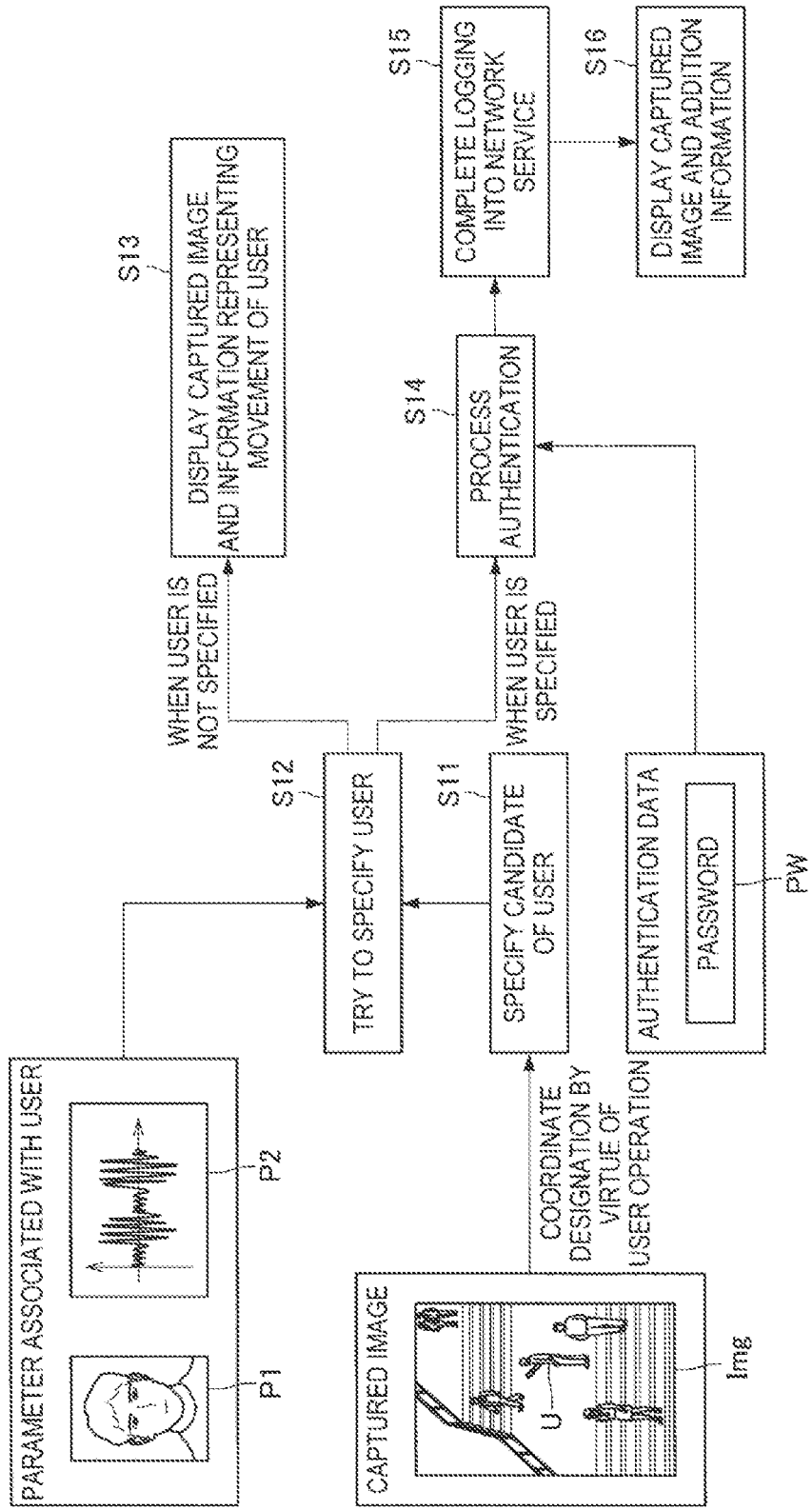

[Fig. 5]
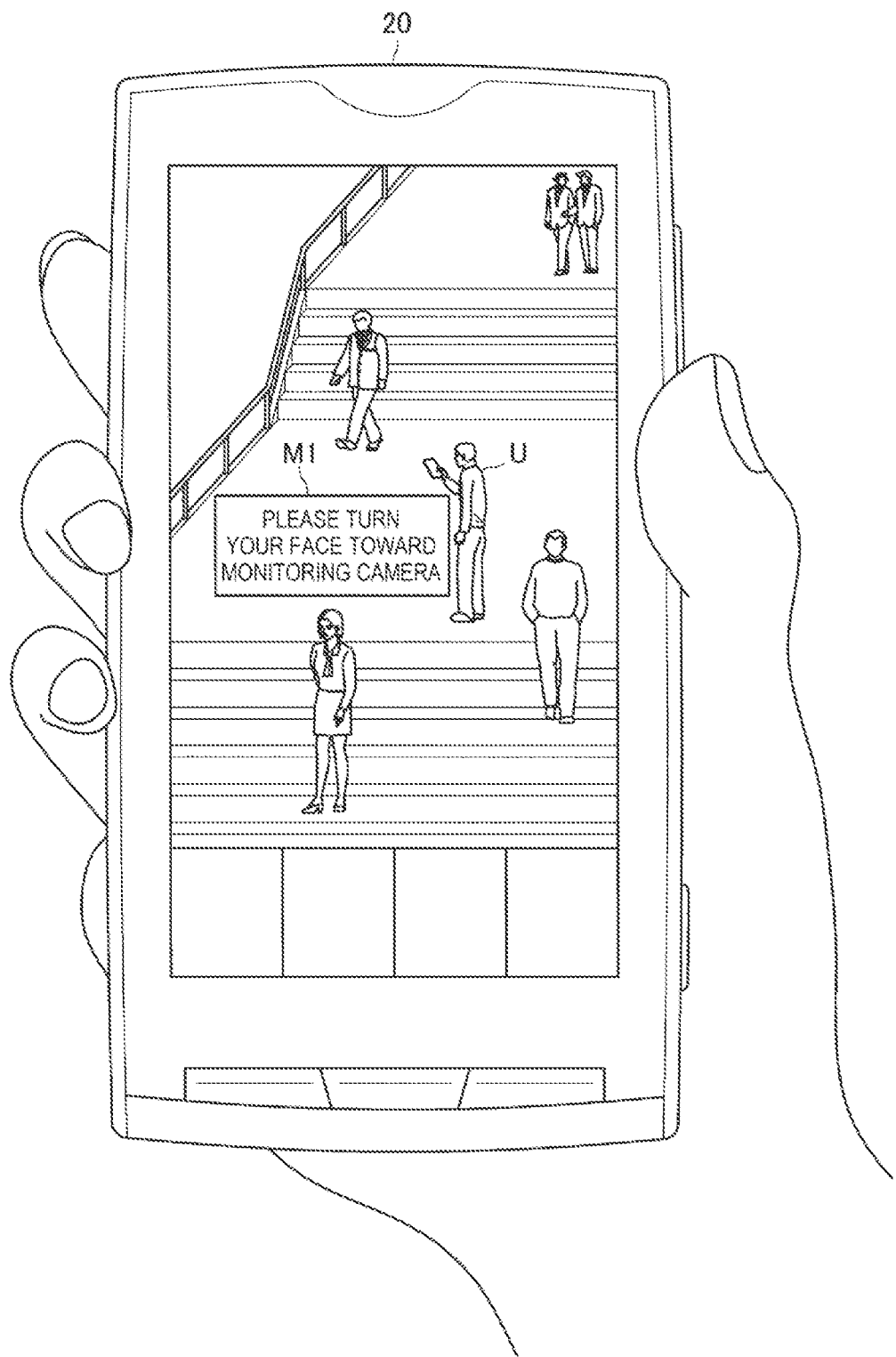

[Fig. 6]
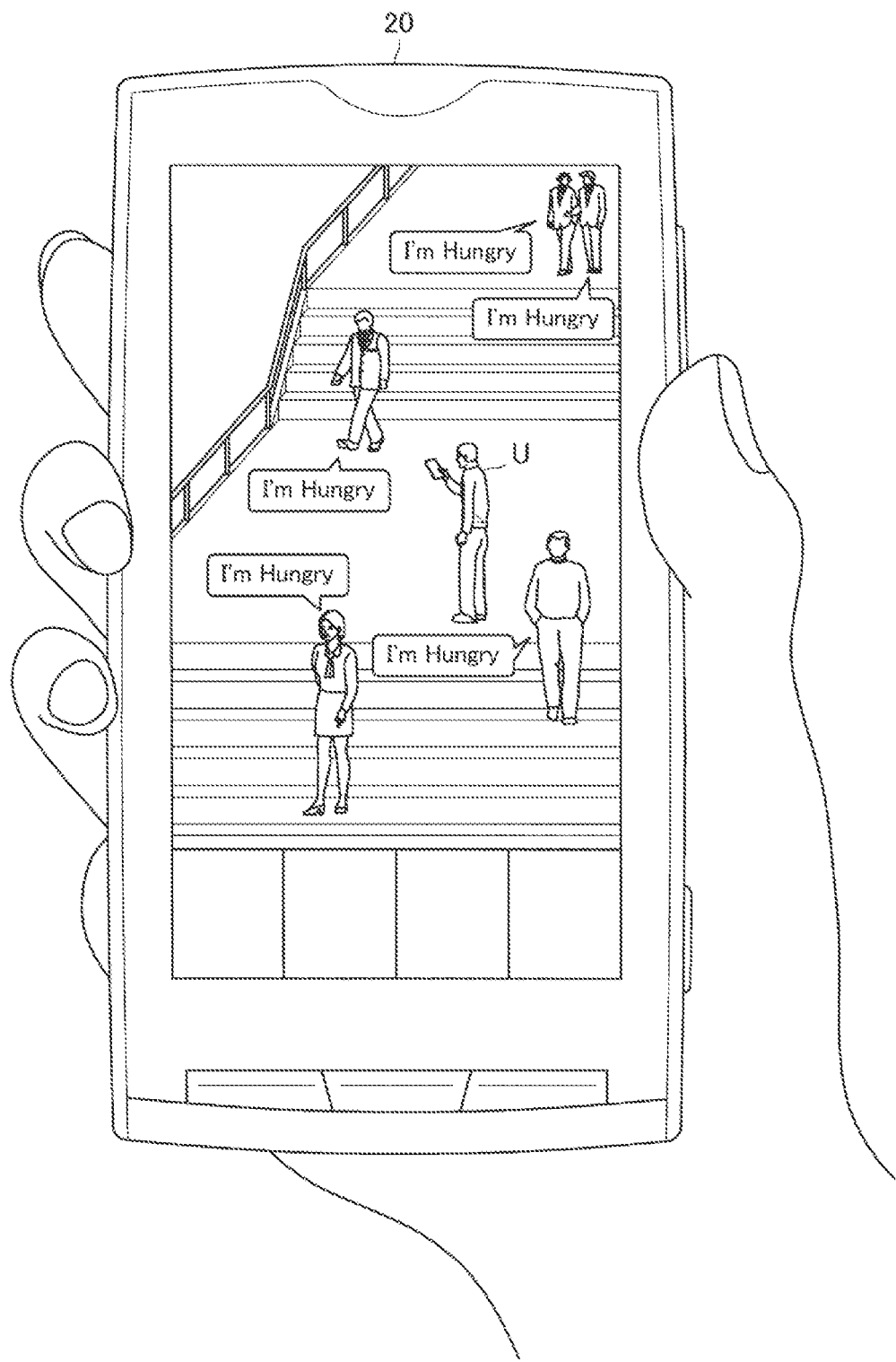

[Fig. 7]
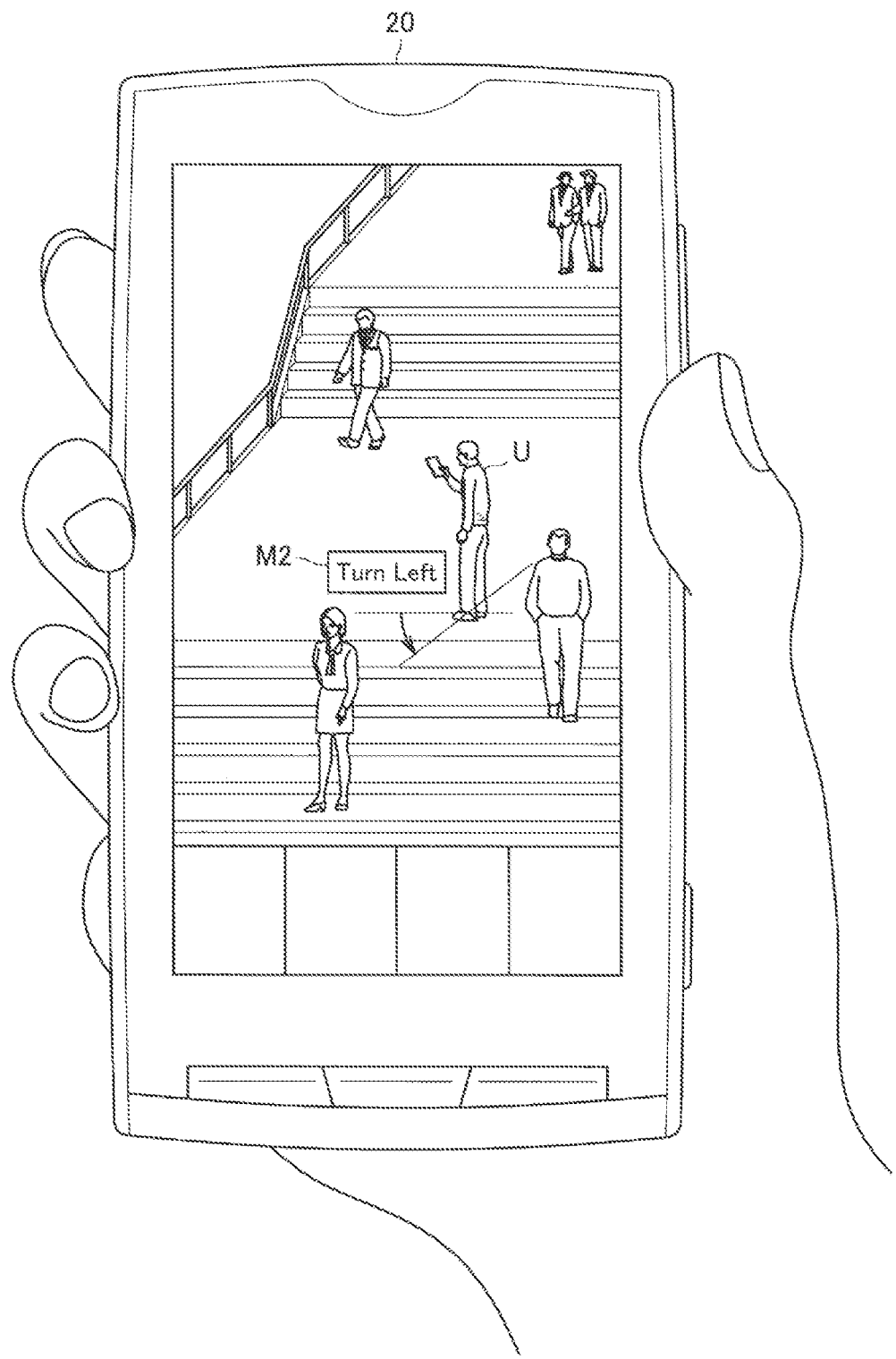

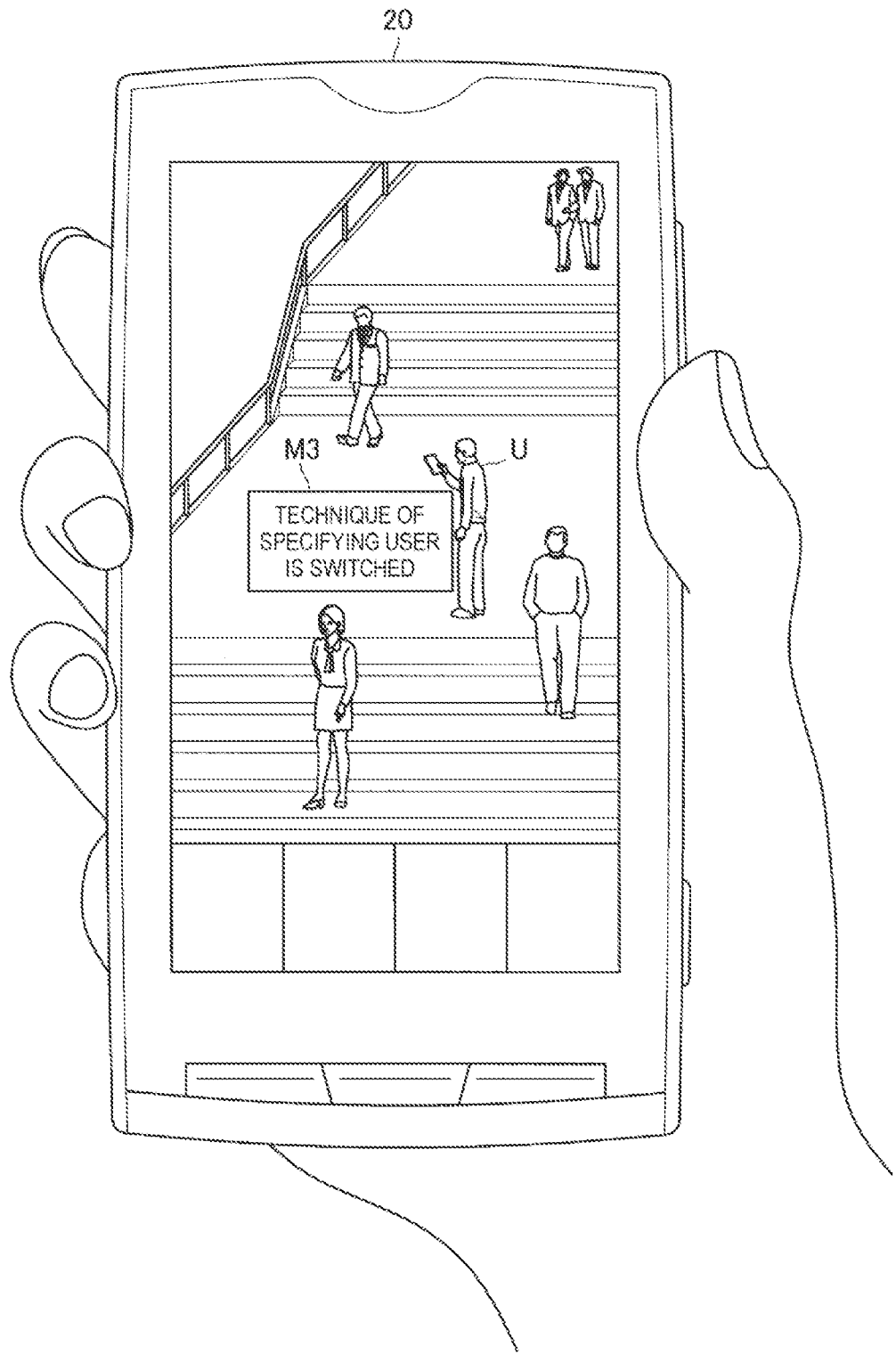
[Fig. 8]

[Fig. 9]
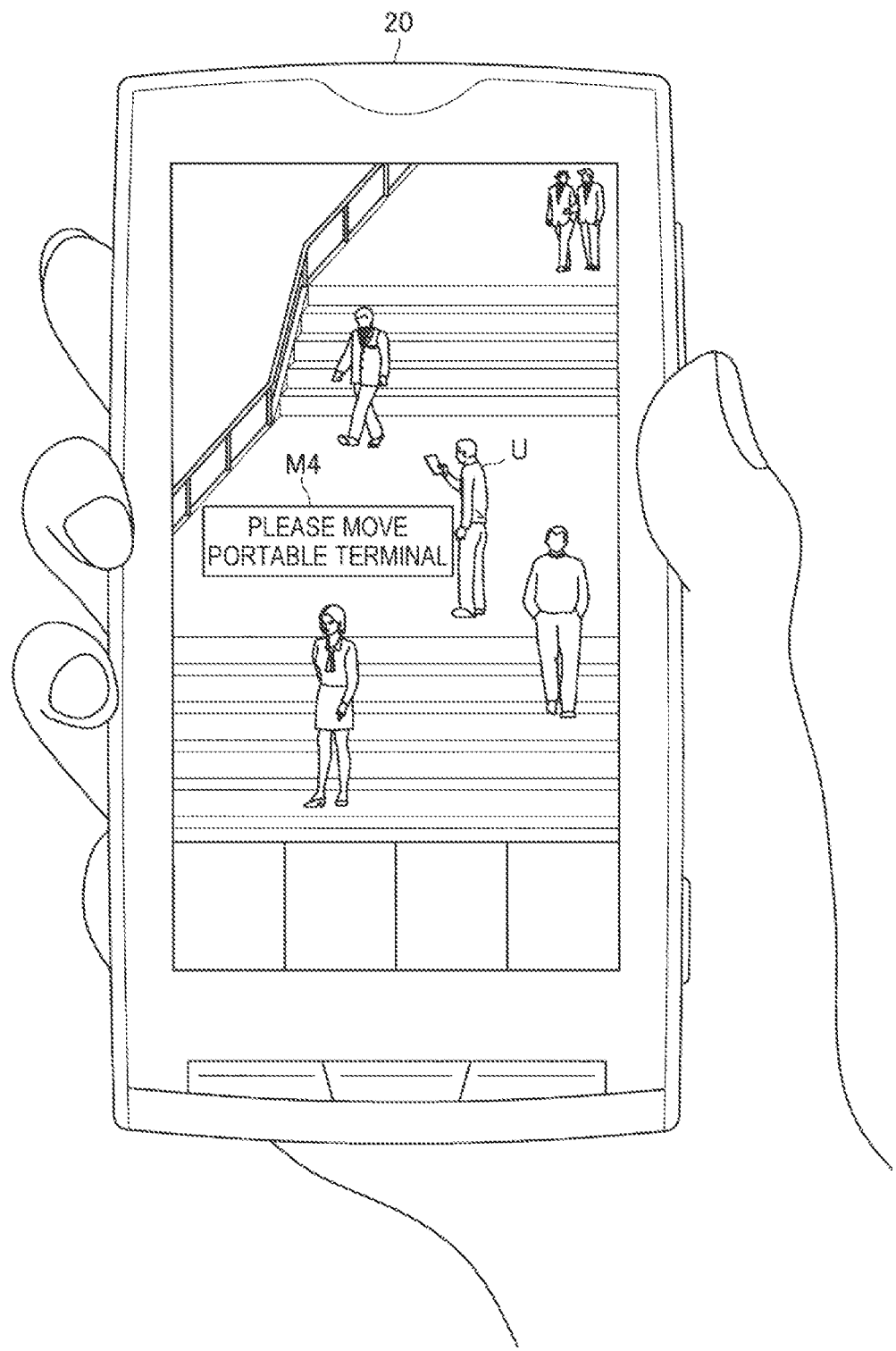

[Fig. 10]
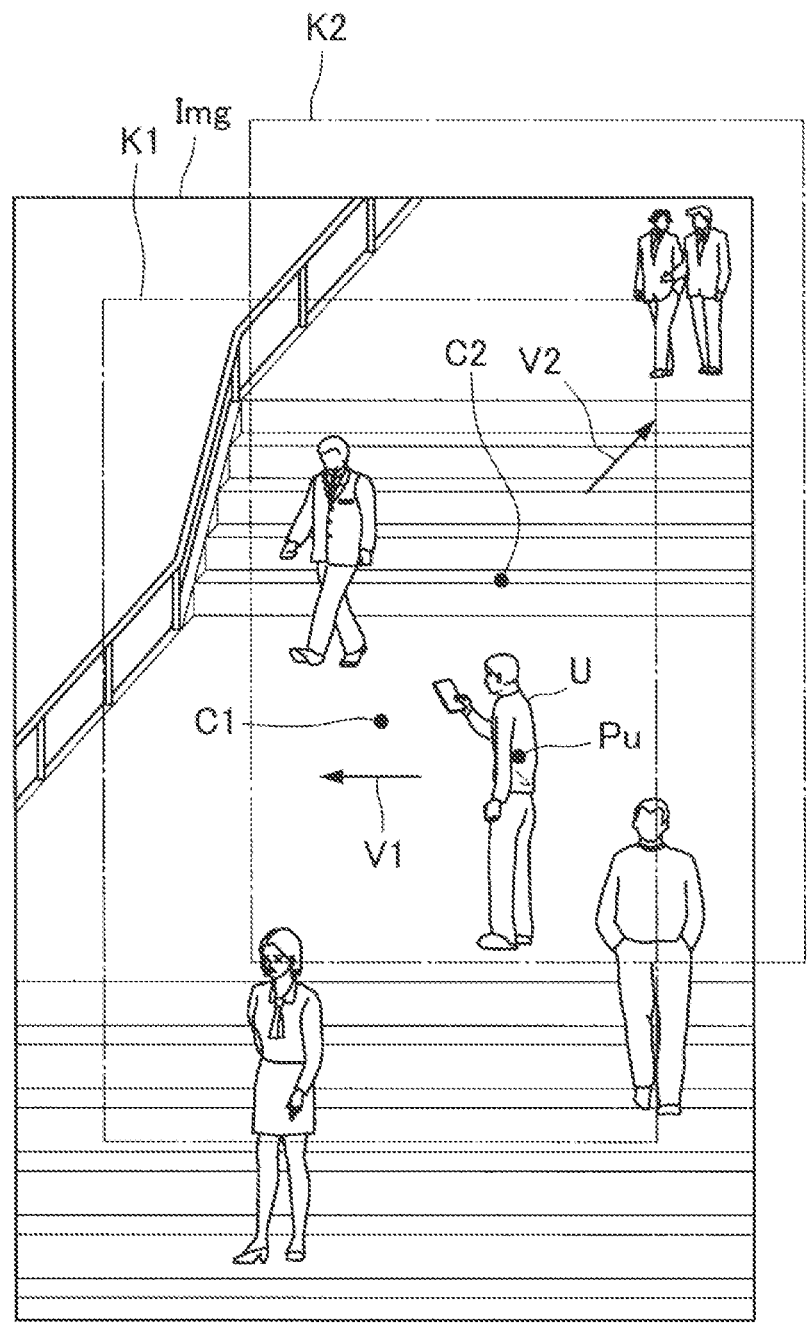

[Fig. 11]
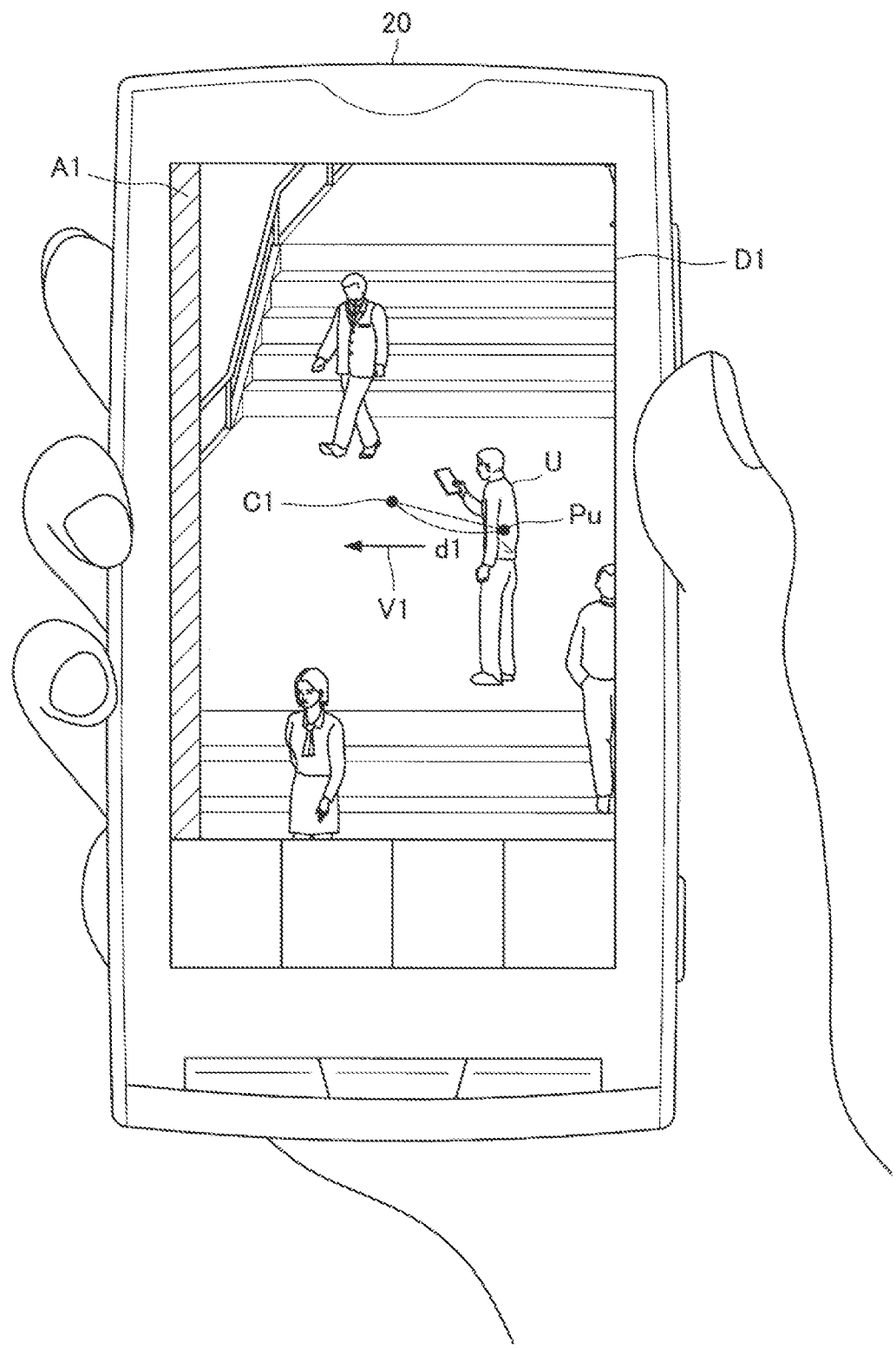

[Fig. 12]
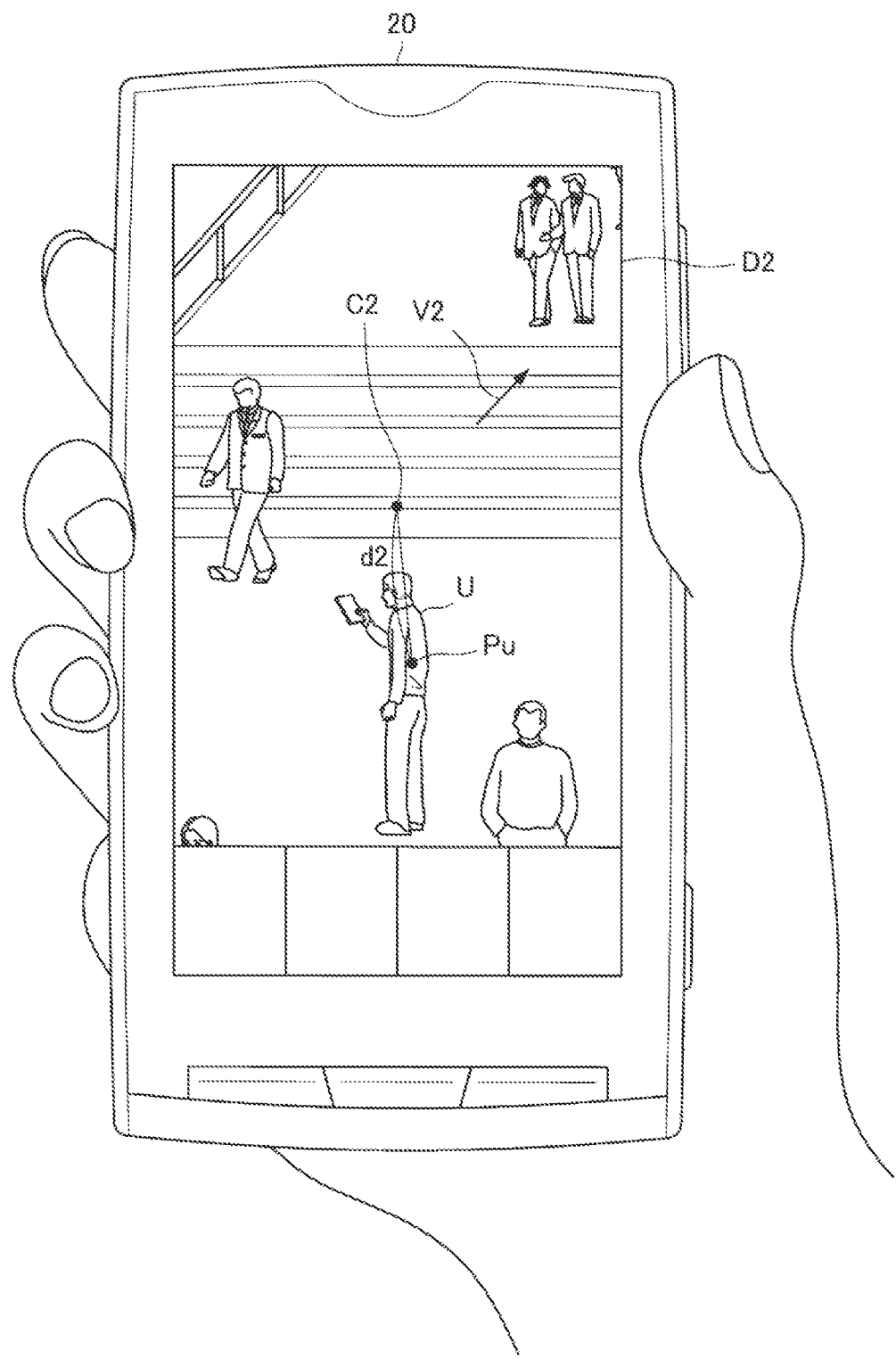

[Fig. 13]

| KIND OF IMAGING DEVICE \ NUMBER OF IMAGING DEVICES | ONE | TWO OR MORE |
|---|---|---|
| DIRECTION ADJUSTABLE CAMERA | CHANGE DIRECTION OF IMAGING DEVICE | DETERMINE DISPLAY IMAGE FROM CAPTURED IMAGES PROVIDED FROM RESPECTIVE IMAGING DEVICES |
| ANGLE-OF-VIEW ADJUSTABLE CAMERA | CHANGE ANGLE OF VIEW | |
| FIXED CAMERA | SELECT REGION FROM IMAGING DEVICE | |

[Fig. 14]
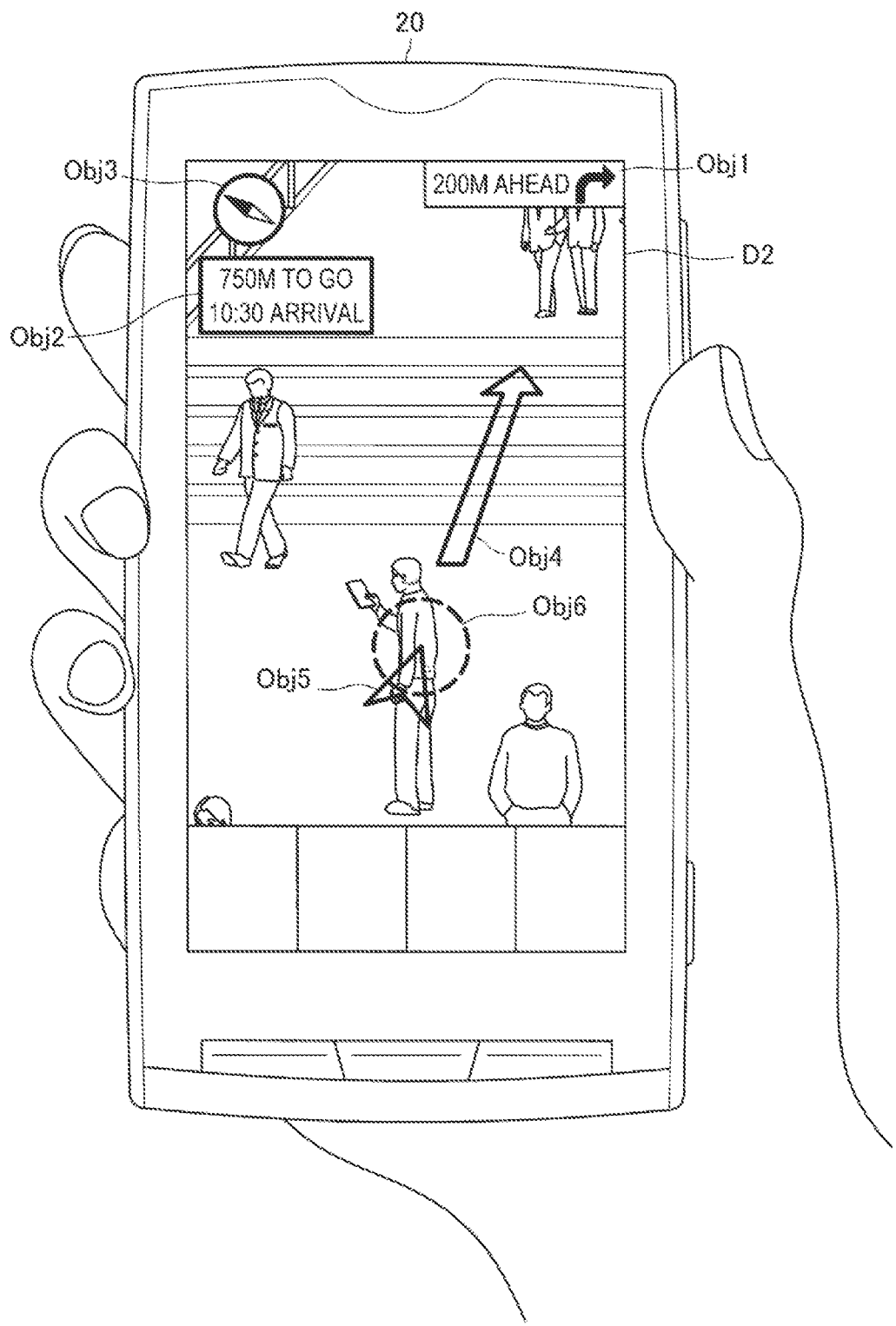

[Fig. 15]
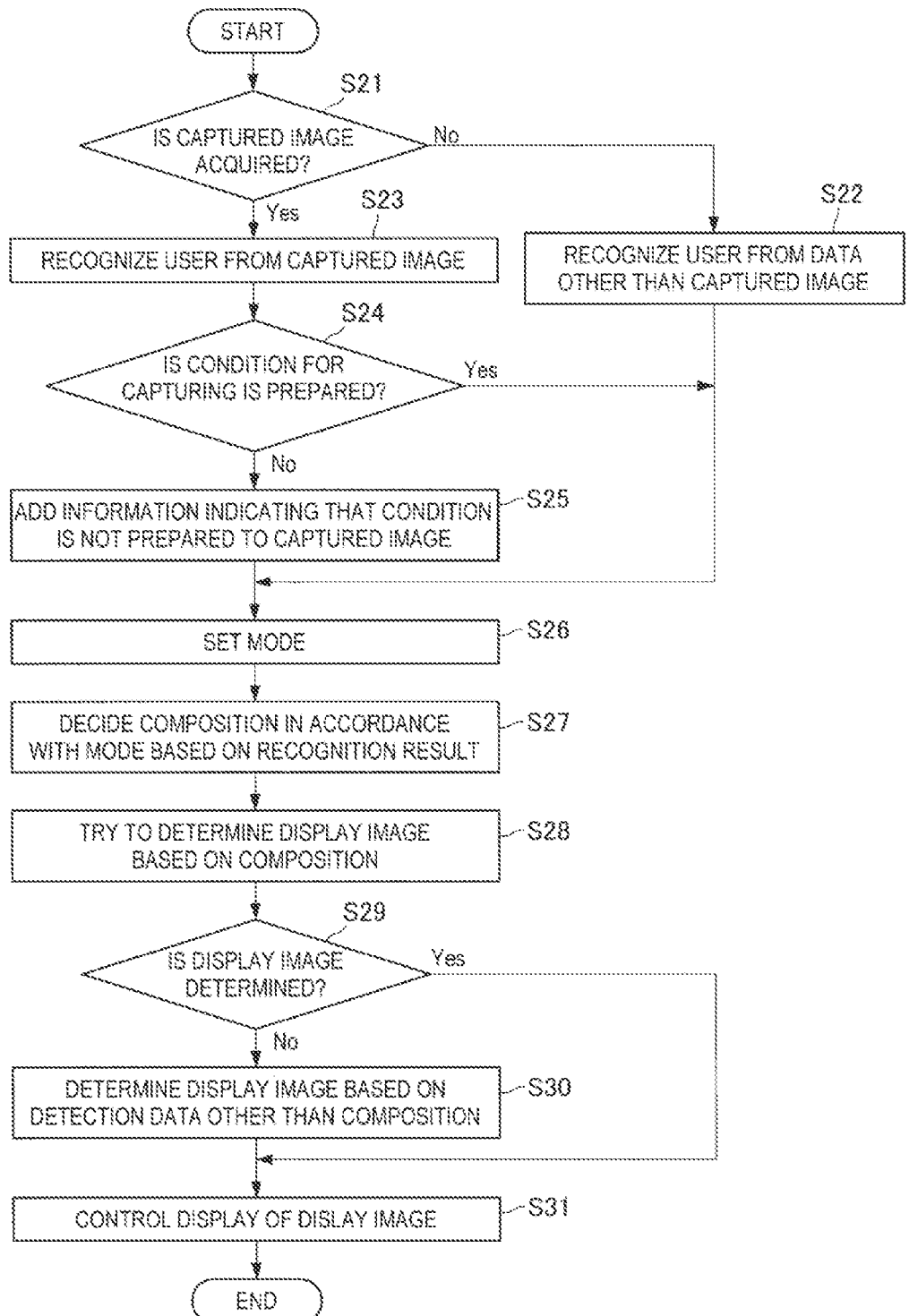

[Fig. 16]
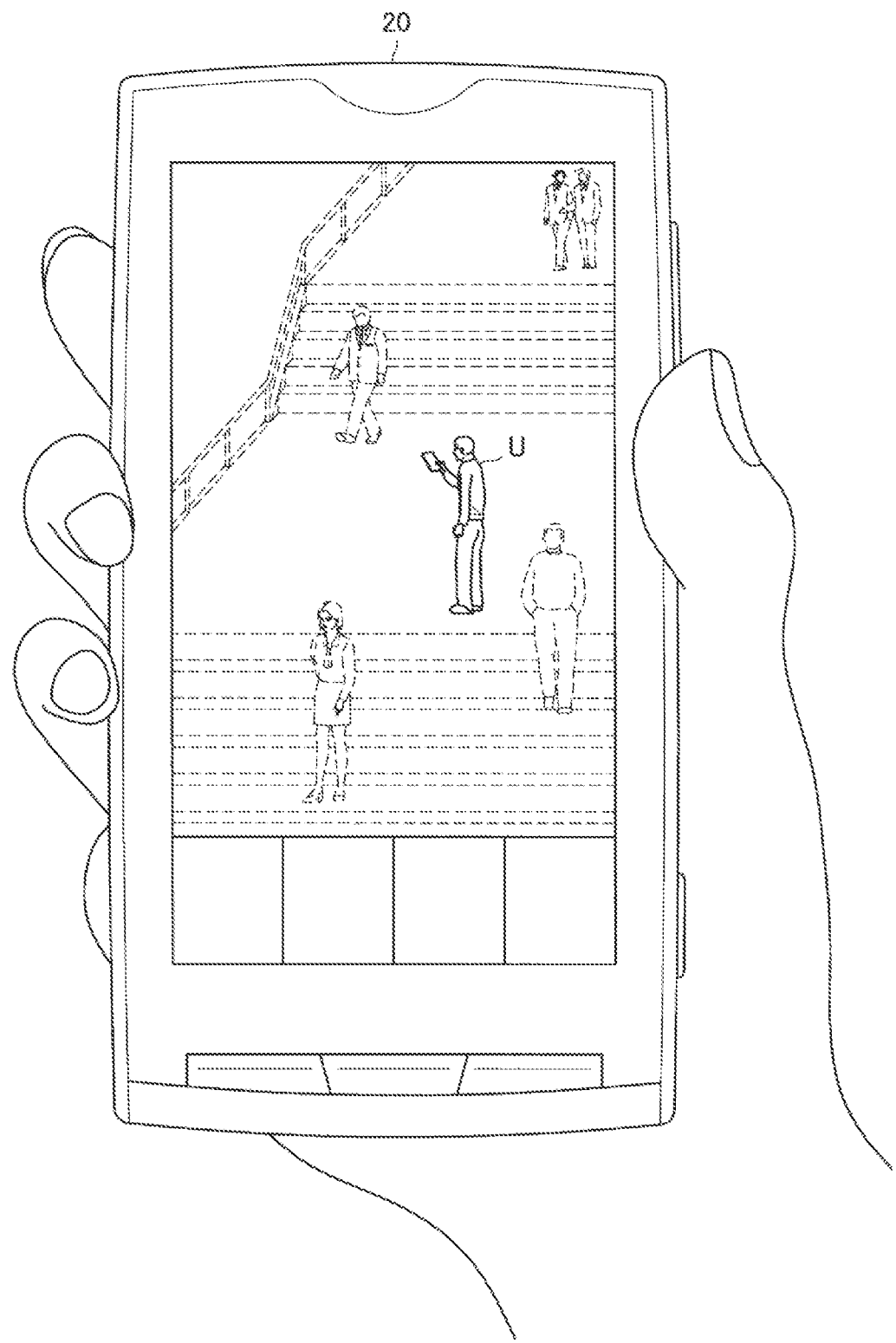

[Fig. 17]
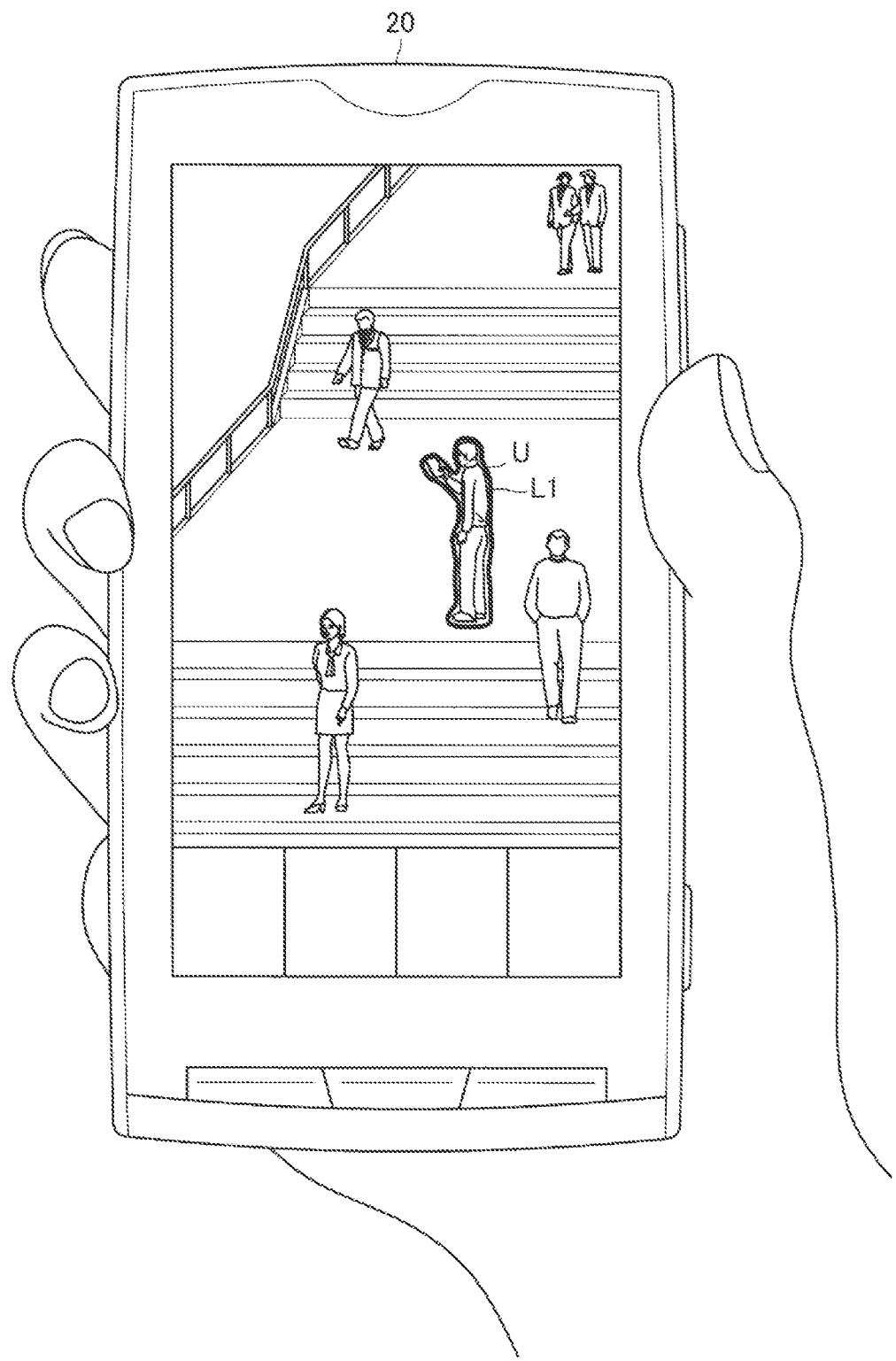

[Fig. 18]
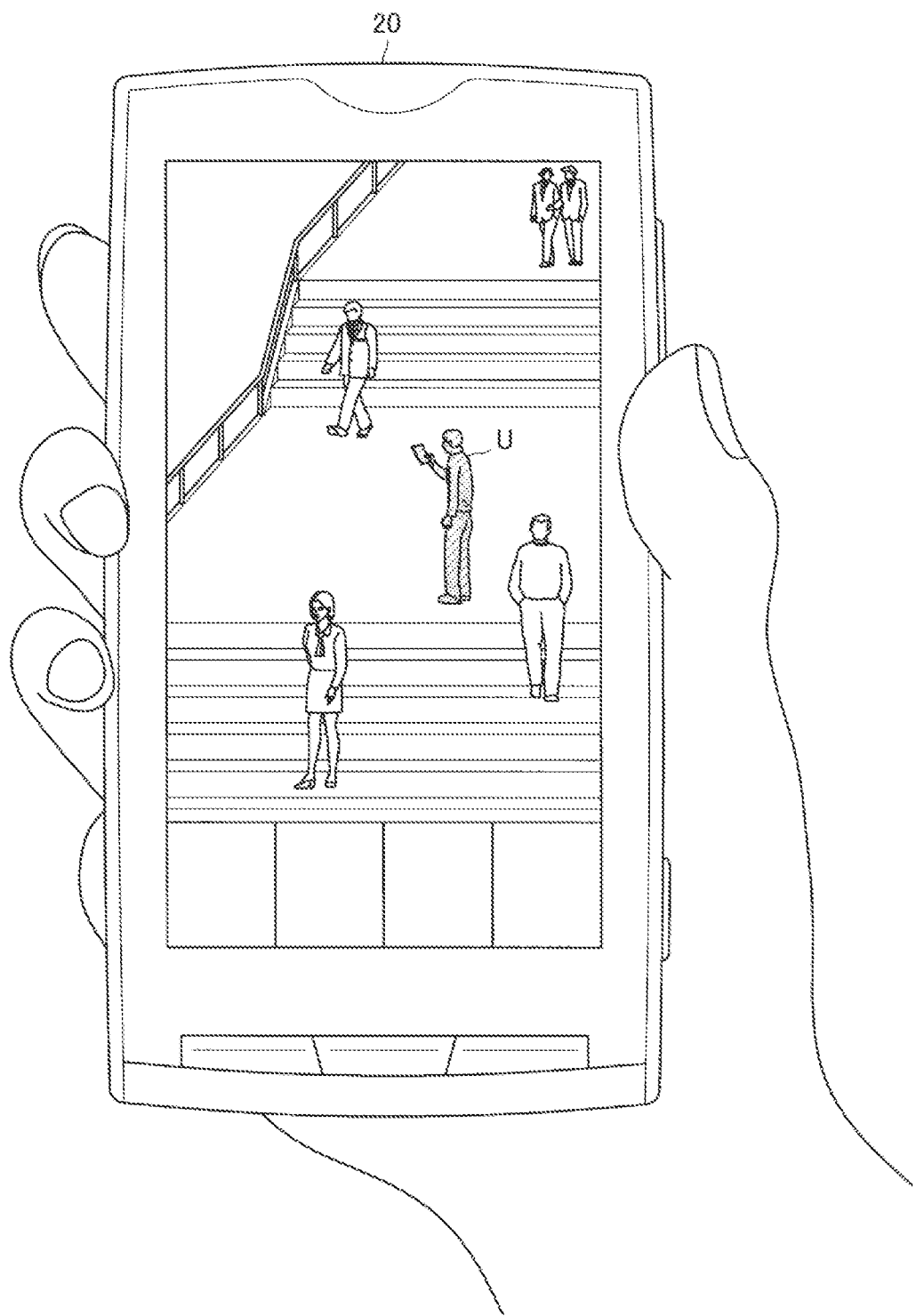

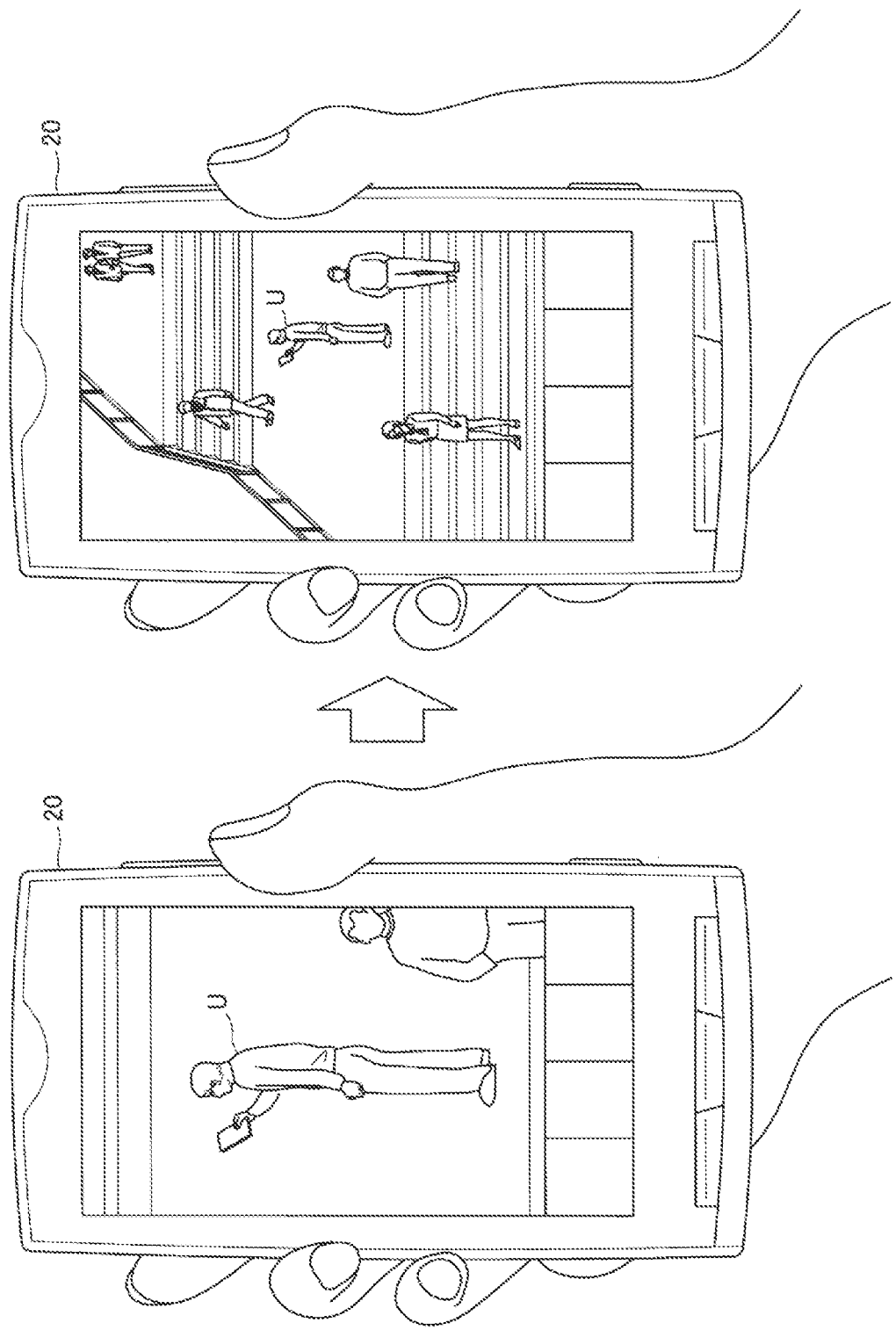
[Fig. 19]

[Fig. 20]
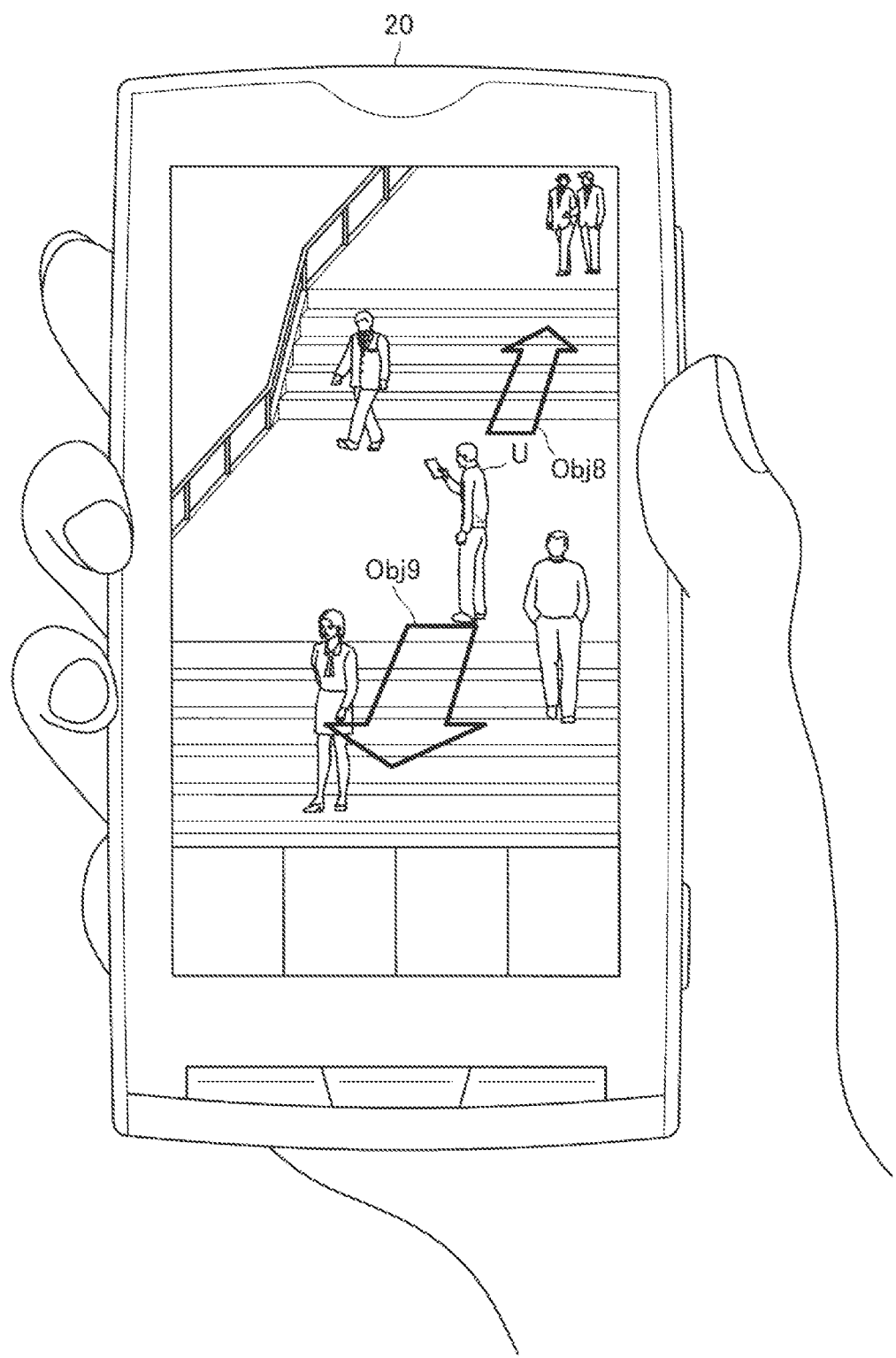

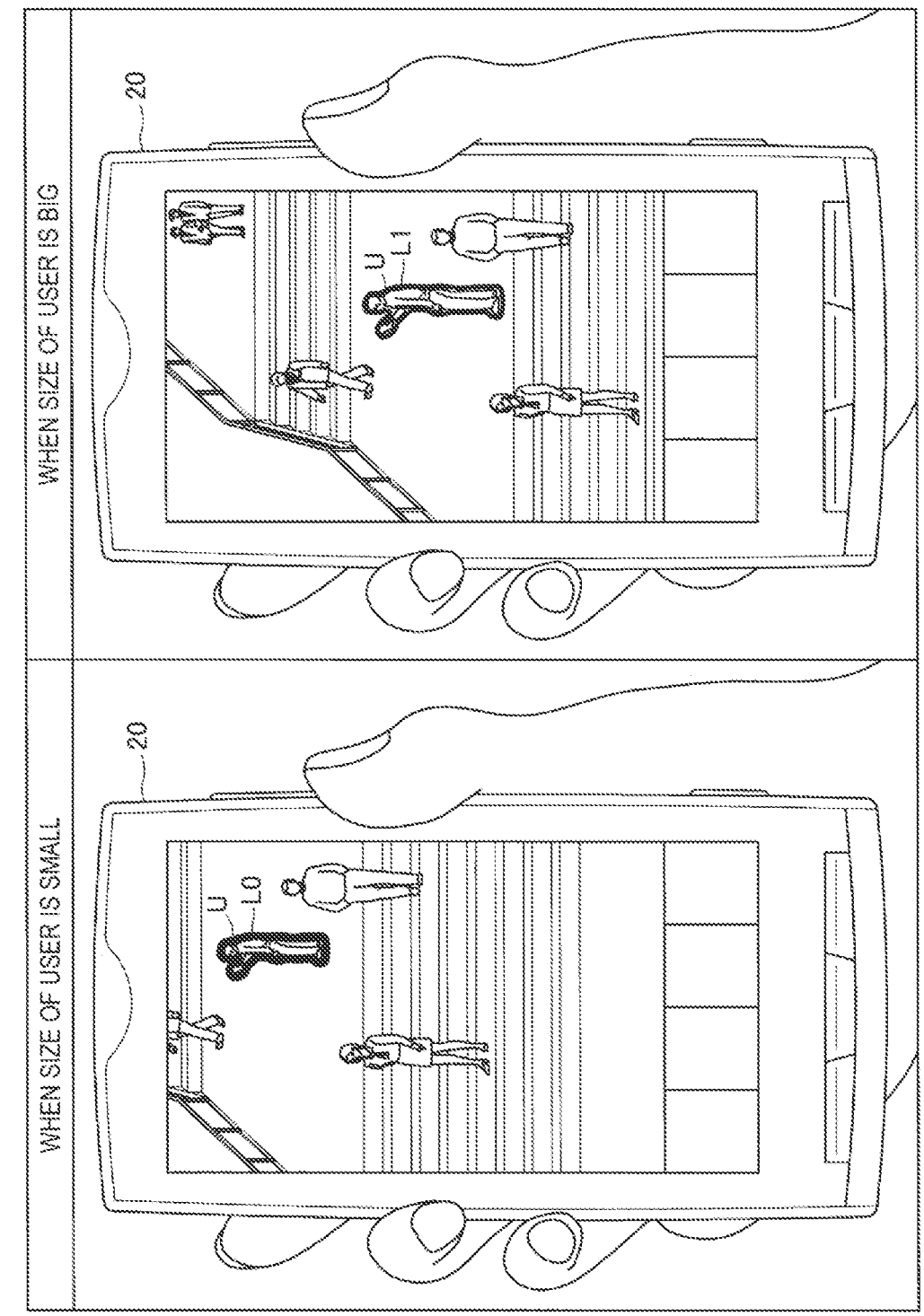

[Fig. 22]
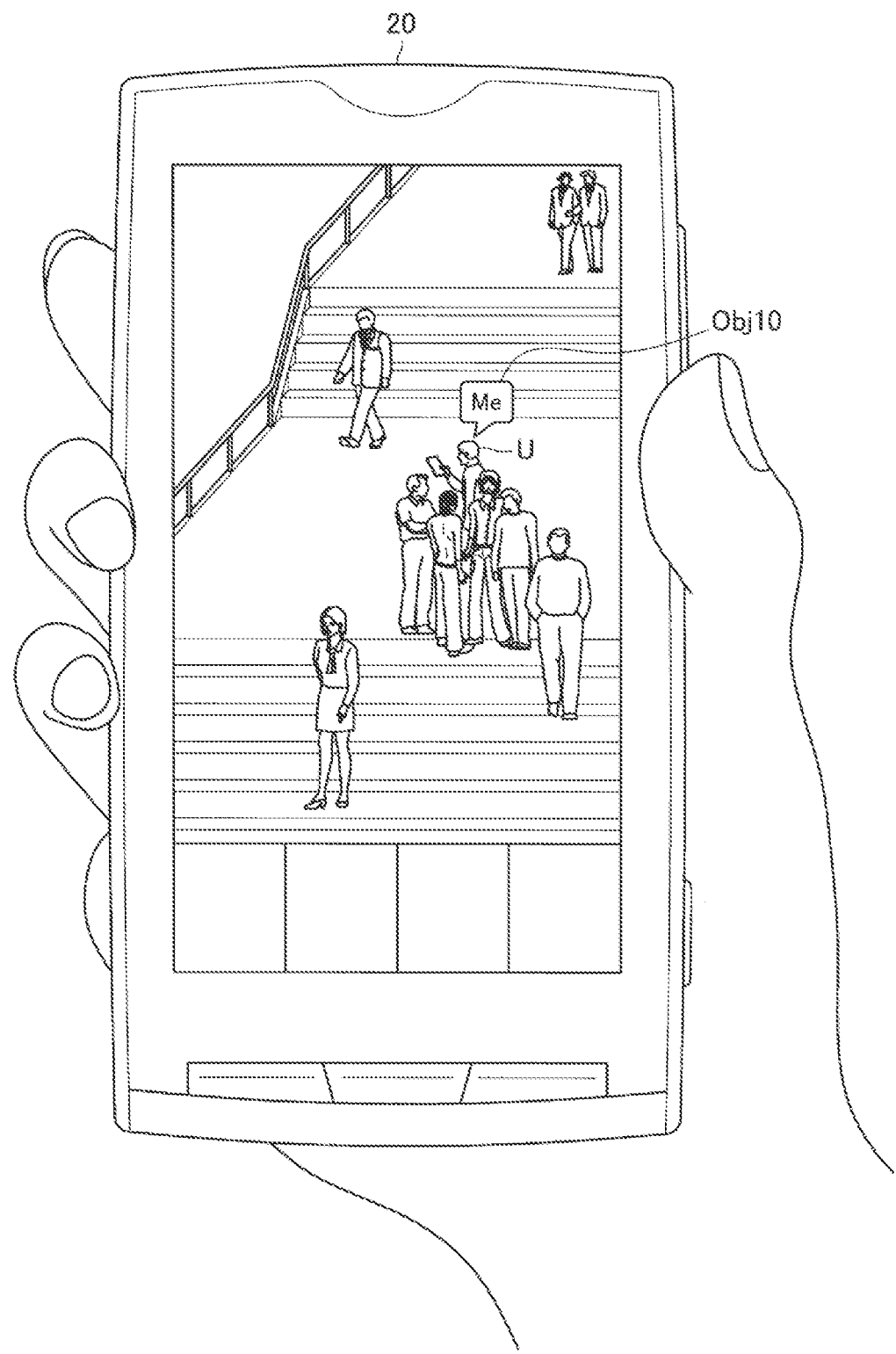

[Fig. 23]
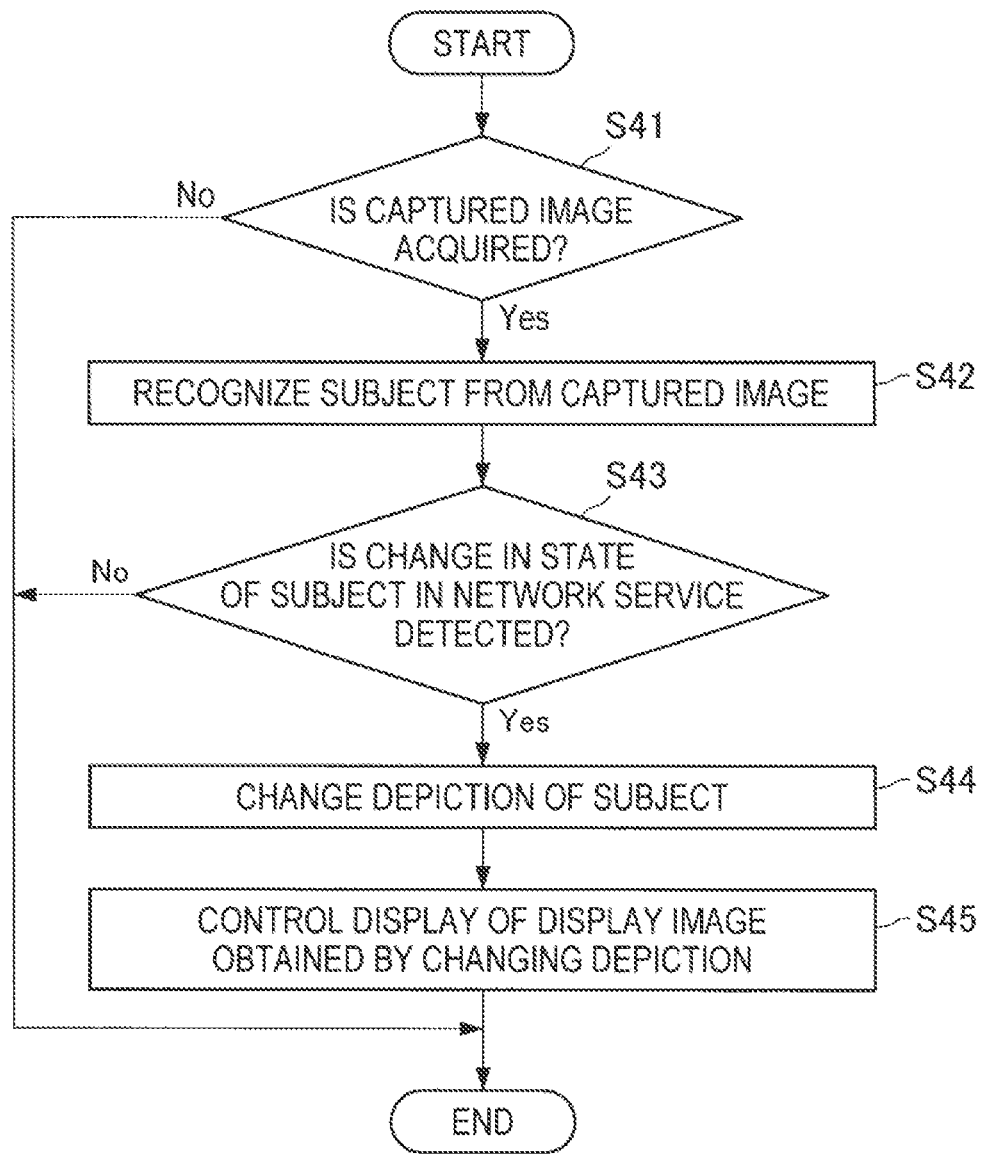

INFORMATION PROCESSING DEVICE AND INFORMATION PROCESSING METHOD

CROSS-REFERENCE TO RELATED APPLICATIONS

The present application is a continuation application of U.S. patent application Ser. No. 14/386,120, filed Sep. 18, 2014, which is a national stage application under 35 U.S.C. § 371 of International Application No. PCT/JP2013/001868, filed Mar. 19, 2013, and claims the benefit of priority from prior Japanese Patent Application JP 2012-071331, filed Mar. 27, 2012, the entire content of which is hereby incorporated by reference. Each of the above-referenced applications is hereby incorporated herein by reference in its entirety.

TECHNICAL FIELD

The present disclosure relates to an information processing device, an information processing method, and a program.

BACKGROUND ART

In recent years, techniques for controlling capturing directions have been developed. For example, a technique of attaching a light emitter emitting a blinking signal with a predetermined pattern to a subject, specifying a position of the subject based on a detection result when the blinking signal having the predetermined pattern is detected, and controlling a capturing direction using the position of the subject is disclosed (e.g., see Patent Literature 1). According to this technique, a captured image is generated to obtain a composition in which the subject is within the captured image.

In addition to the technique of attaching the light emitter to the subject, there exist various techniques that generate the captured image to obtain a composition in which the subject is within the captured image.

CITATION LIST

Patent Literature

[PTL 1]
  JP 2004-153674A

SUMMARY

Technical Problem

However, when a user of a portable terminal is to be captured, it is assumed that using only a composition in which the user is within a captured image is not enough. For example, when the user moves toward a destination, the user is expected to determine a display image having high convenience when the composition is decided after a position of the destination is also taken into consideration. Accordingly, it is desirable to realize a technique that causes the user to determine the display image having a higher convenience.

Solution to Problem

In view of the above, the embodiments of the present technology are provided. According to an illustrative embodiment, an information processing device includes an image acquisition unit configured to receive an image; a recognition unit configured to acquire a recognition result of a user based on the received image, wherein the recognition result includes a position of the user, the user being associated with a display terminal; an image determination unit configured to determine an object based on the recognition result; and a display control unit configured to control display of the object on the display terminal.

Advantageous Effects of Invention

In accordance with the technology of the present disclosure, it is possible for a user to determine a display image having higher convenience.

BRIEF DESCRIPTION OF DRAWINGS

FIG. 1 is a diagram illustrating a brief overview in accordance with a present embodiment.

FIG. 2 is a diagram illustrating a configuration of an information processing system in accordance with the present embodiment.

FIG. 3 is a block diagram illustrating a functional configuration of an information processing device in accordance with the embodiment.

FIG. 4 is a diagram illustrating a brief overview of a user specification function of an information processing device.

FIG. 5 is a diagram illustrating a display example of a portable terminal when the user specification fails.

FIG. 6 is a diagram illustrating a display example of a portable terminal when the user specification succeeds.

FIG. 7 is a diagram illustrating a display example of a portable terminal when the user specification fails.

FIG. 8 is a diagram illustrating a display example of a portable terminal when the user specification fails.

FIG. 9 is a diagram illustrating a display example of a portable terminal when the user specification fails.

FIG. 10 is a diagram illustrating a brief overview of a composition decision function of the information processing device.

FIG. 11 is a diagram illustrating a display image at the time of setting a first mode.

FIG. 12 is a diagram illustrating a display image at the time of setting a second mode.

FIG. 13 is a diagram illustrating a variation of a technique of determining a display image.

FIG. 14 is a diagram illustrating an example of the determined display image.

FIG. 15 is a flowchart illustrating a flow of composition decision operations of the information processing device.

FIG. 16 is a diagram illustrating an example of a depiction change function of the information processing device.

FIG. 17 is a diagram illustrating another example of a depiction change function of the information processing device.

FIG. 18 is a diagram illustrating another example of a depiction change function of the information processing device.

FIG. 19 is a diagram illustrating another example of a depiction change function of the information processing device.

FIG. 20 is a diagram illustrating another example of a depiction change function of the information processing device.

FIG. 21 is a diagram illustrating another example of a depiction change function of the information processing device.

FIG. 22 is a diagram illustrating another example of a depiction change function of the information processing device.

FIG. 23 is a flowchart illustrating a flow of depiction change operations of the information processing device.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, each of a plurality of structural elements having substantially the same function is distinguished by affixing a different letter to the same reference numeral in some cases. However, when there is no particular necessity to distinguish between structural elements having substantially the same function, they are denoted by the same reference numeral.

First, "Description of Embodiments" will be described in accordance with the order listed below.
1. User specification function
2. Composition decision function
3. Depiction change function
4. Conclusion Functions of the information processing device according to the present embodiment are broadly classified into a user specification function, a composition specification function, and a depiction change function. First, before describing each of the functions, a condition that is a premise of each function will be described.

FIG. 1 is a diagram illustrating a brief overview of the present embodiment. As shown in FIG. 1, a user U having a portable terminal 20 is present in a real space. The user U may be present anywhere in the real space. In addition, a function of displaying an image is installed in the portable terminal 20, and it is possible for the user U to view a screen displayed by the portable terminal 20. The user U is captured by an imaging device 30 provided to be separate from the portable terminal 20. A position in which the imaging device 30 is to be provided is not particularly limited. For example, the imaging device may be provided in a building such as in a monitoring camera, or may be provided in a mobile object such as a vehicle. In addition, a kind of the imaging device 30 is not particularly limited, but may be an infrared camera or the like, for example.

FIG. 2 is a diagram illustrating a configuration of an information processing system in accordance with the present embodiment. As shown in FIG. 2, the information processing system 1 includes an information processing device 10, a portable terminal 20, and an imaging device 30. Although the information processing device 10 and the portable terminal 20 are connected via a network 40 in FIG. 2, the number of the portable terminal 20 connected to the network 40 may not be one. For example, a plurality of the portable terminals 20 may be present, and each of the portable terminals 20 may be connected to the network 40.

In addition, as shown in FIG. 2, the information processing device 10 is connected to the imaging device 30. Although one imaging device 30 is connected to the information processing device 10 in the example shown in FIG. 2, the number of the imaging device 30 may not be one. For example, a plurality of the imaging devices 30 may be present, and each of the imaging devices 30 may be connected to the information processing device 10.

In addition, although the information processing device 10 is configured to be separate from the portable terminal 20 and the imaging device 30 in the example shown in FIG. 2, the information processing device may be embedded in the portable terminal 20, or may be embedded in the imaging device 30. A captured image captured by the imaging device 30 is provided to the portable terminal 20 via the information processing device 10, and it is possible for the portable terminal 20 to display the captured image. The information processing device 10 may use the captured image provided from the imaging device 30 to exert the user specification function, the composition decision function, and the depiction change function.

FIG. 3 is a block diagram illustrating functional configuration of the information processing device 10 in accordance with the present embodiment. As shown in FIG. 3, the information processing device 10 includes a processing control unit 100, a display control unit 160, and a storage unit 50. In addition, the processing control unit 100 has an image acquisition unit 111, a parameter acquisition unit 112, a candidate extraction unit 113, a specification unit 114, and an authentication unit 115. The image acquisition unit 111, the parameter acquisition unit 112, the candidate extraction unit 113, the specification unit 114, and the authentication unit 115 are blocks mainly associated with the user specification function of the information processing device 10.

In addition, the processing control unit 100 has a recognition unit 121, a condition decision unit 122, an information addition unit 123, a mode setting unit 124, a composition decision unit 125, and an image determination unit 126. The recognition unit 121, the condition decision unit 122, the information addition unit 123, the mode setting unit 124, the composition decision unit 125, and the image determination unit 126 are blocks mainly associated with the composition decision function of the information processing device 10.

In addition, the processing control unit 100 has a change detection unit 131 and a depiction change unit 132. The change detection unit 131 and the depiction change unit 132 are blocks mainly associated with the depiction change function of the information processing device 10.

The processing control unit 100 and the display control unit 160 correspond to processors such as a CPU (Central Processing Unit) or a DSP (Digital Signal Processor). The processing control unit 100 and the display control unit 160 exert various functions of the processing control unit 100 and the display control unit 160 by executing a program stored in the storage unit 50 or another storage medium.

The storage unit 50 uses a storage medium such as a semiconductor memory or a hard disk to store programs and data for processes to be carried out by the processing control unit 100 and the display control unit 160. For example, the storage unit 50 stores a feature amount dictionary used to recognize an object. Further, the storage unit 50 may store a recognition result that is generated as a result of the object recognition. Although the storage unit 50 is configured to be embedded in the information processing device 10 in the example shown in FIG. 3, the storage unit 50 may be configured to be separate from the information processing device 10.

Premises of the respective functions have been described. Hereinafter, each of the functions will be described in order.

1. USER SPECIFICATION FUNCTION

First, the user specification function of the information processing device 10 will be described. FIG. 4 is a diagram illustrating a brief overview of the user specification function of the information processing device 10. The image acquisition unit 111 first acquires a captured image captured by the imaging device 30. In the example shown in FIG. 4, as an example of the captured image, a captured image Img in which a real space shown in FIG. 1 is captured is acquired by the image acquisition unit 111. The captured image acquired by the image acquisition unit 111 is controlled to be displayed in the portable terminal 20 by the display control unit 160.

According to the user specification function, a user is specified from a subject shown in the captured image acquired by the image acquisition unit 111. The purpose of the user specification is not particularly limited. However, it is assumed herein that a network service is provided by the information processing device 10 and the user specification is carried out so as to allow the user U to log into the network service via the portable terminal 20.

In addition, the kind of the network service is not particularly limited. However, a service allowing a user to write a message or to read the message written by the user or another user using a portable terminal in which logging into the network service is completed is assumed herein. Although the timing for specifying the user is not particularly limited, a timing at which an operation for the user to request the user specification is performed on the portable terminal 20 may be used. The operation for requesting the user specification may be an operation for request to log into the network service.

In order to specify the user from the subject shown in the captured image, the parameter acquisition unit 112 acquires parameters associated with the user to be specified. Although the timing for the parameter acquisition unit 112 to acquire the parameters is not particularly limited, for example, the parameters may be acquired in advance from the portable terminal 20 of the user, or may be acquired from the portable terminal 20 when the user is specified.

The kind of the parameter to be acquired by the parameter acquisition unit 112 is not particularly limited. For example, as shown in FIG. 4, the parameter acquisition unit 112 may acquire a face image of the user as the parameter P1, and may acquire sensor data representing a movement of the user as the parameter P2. A device capturing the face image of the user is not particularly limited. For example, the face image of the user may be a face image captured by the portable terminal 20, or may be a face image captured by another device.

In addition, a sensor detecting the movement of the user is not particularly limited. The sensor detecting the movement of the user may be an acceleration sensor, a sensor receiving GPS signals, and a sensor receiving radio waves transmitted from a Wi-Fi base station. In addition, the sensor detecting the movement of the user may be embedded in the portable terminal 20, and may be mounted on a body of the user.

Before the user is specified by the specification unit 114, a candidate of the user may be specified by the candidate extraction unit 113 (step S11). For example, when coordinates on the captured image displayed in the portable terminal 20 by the user operation input to the portable terminal 20 (e.g., a touch operation of the touch panel) are designated, the parameter acquisition unit 112 acquires the coordinates, and the candidate extraction unit 113 may specify a subject selected by the coordinates (e.g., the subject present on the coordinates) as the candidate of the user. By specifying the candidate of the user, a load necessary to specify the user is reduced.

The specification unit 114 tries to specify the user from the captured image based on the parameter acquired by the parameter acquisition unit 112 (step S12). For example, when the face image of the user is acquired as the parameter P1 by the parameter acquisition unit 112, the specification unit 114 may specify the subject extracted based on a combination of a facial region of the subject shown in the captured image acquired by the image acquisition unit 111 and the face image as the user. For example, the specification unit 114 may specify the subject having the face image of the user and the facial region of the similarity exceeding a threshold value as the user.

In addition, for example, when sensor data representing the movement of the user is acquired as the parameter P2 by the parameter acquisition unit 112, the specification unit 114 may specify the subject extracted based on a combination of the movement of the subject detected from the captured image acquired by the image acquisition unit 111 and the sensor data as the user. For example, the specification unit 114 may specify the subject in which the movement of the user in the captured image and the sensor data of the similarity exceeding a threshold value are detected as the user. In addition, when the candidate of the user is specified, the specification unit 114 may specify the user based on the parameter from the candidate of the user.

As a result of the specification unit 114 trying to specify the user, it is also assumed that the user is not specified. For example, a case in which the similarity does not exceed the threshold value corresponds to the situation assumed above. Accordingly, when the user is not specified by the specification unit 114, the display control unit 160 controls the portable terminal 20 to display information indicating the operation of the user necessary to specify the user in the portable terminal 20. In accordance with the control of the display control unit 160, the information indicating the movement of the user is displayed in the portable terminal 20 (step S13).

FIG. 5 is a diagram illustrating a display example of the portable terminal 20 when the user specification fails. For example, when the user is not specified by the specification unit 114, the display control unit 160 may control the portable terminal 20 such that the information prompting the user to turn his or her face toward the imaging device is displayed in the portable terminal 20. In FIG. 5, the example in which the imaging device 30 is assumed to be a monitoring camera and the display control unit 160 controls the portable terminal 20 such that a message M1 indicating "Please turn your face toward the monitoring camera" is displayed in the portable terminal 20 is shown.

A description will be made with reference back to FIG. 4. When the user is specified by the specification unit 114, before the flow proceeds to step S15, the authentication unit 115 may perform the authentication process on the portable terminal 20 specified by the specification unit 114 (step S14). In particular, for example, as shown in FIG. 4, when a password is input by a user operation input to the portable terminal 20, the authentication unit 115 may determine success and failure by determining whether the input password matches a password that is registered in advance. When the authentication is successful, the flow proceeds to step S15. When the authentication fails, the authentication process may be performed again instead of proceeding to step S15.

When the flow proceeds to step S15, for example, logging into the network service is completed (step S15) and the display control unit 160 controls the portable terminal 20 such that the captured image and the additional information are displayed by the portable terminal 20. In accordance with the control of the display control unit 160, the captured image and the additional information are displayed in the portable terminal 20 (step S16). Although the additional information is not particularly limited, for example, the additional information may be a message written by the user himself/herself or another user.

FIG. 6 is a diagram illustrating a display example of the portable terminal 20 when the user specification is successful. For example, when the user is specified by the specification unit 114, the display control unit 160 controls the portable terminal 20 such that the captured image and the additional information are displayed. An example in which the display control unit 160 controls the portable terminal 20 such that a message written by another user is displayed as the additional information is shown in FIG. 6.

In addition, the information prompting the user to turn his or her face toward the imaging device is not limited to the example shown in FIG. 5. FIG. 7 is a diagram illustrating a display example of the portable terminal 20 when the user specification fails. The display control unit 160 may control the portable terminal 20 such that information indicating the movement of the user necessary to specify the user is displayed in the portable terminal 20 based on a position of the candidate of the user extracted by the candidate extraction unit 113 and a position of the imaging device 30 that is set in advance.

For example, as shown in FIG. 7, the display control unit 160 may control the portable terminal 20 such that the portable terminal 20 displays a straight line in a direction that the candidate of the user faces and a straight line in a direction in which the imaging device 30 is present using the position of the candidate of the user as a reference. In addition, as shown in FIG. 7, the display control unit 160 may control the portable terminal 20 such that an arrow representing a rotational direction from the straight line in the direction that the candidate of the user faces to the straight line in the direction in which the imaging device 30 is present is displayed in the portable terminal 20. In addition, as shown in FIG. 7, the display control unit 160 may control the portable terminal 20 such that a message M2 of "Turn Left" is displayed as the message representing the rotational direction that the user has seen in the portable terminal 20.

In addition, when the user is not specified by the specification unit 114, a technique of specifying the user may be switched. FIG. 8 is a diagram illustrating a display example of the portable terminal 20 when the user specification fails. When the user is not specified by the specification unit 114, the display control unit 160 may control the portable terminal 20 such that information indicating that the user is specified by another technique is displayed in the portable terminal 20. For example, the display control unit 160 may control the portable terminal 20 such that a message M3 of "a technique of specifying the user is switched" is displayed as the information indicating that the user is specified by another technique in the portable terminal 20. The specification unit 114 may specify the subject extracted by another specification technique as the user.

For example, the specification unit 114 tries to specify the subject extracted based on a combination of the face region of the subject shown in the captured image and the face image of the user as the user. In this case, when the user is not specified, the specification unit 114 may try to specify the subject extracted based on a combination of the movement of the subject detected by the captured image and sensor data as the user. In addition, the user specification may be tried in reverse order.

In addition, when the user is not specified by the specification unit 114, the user may be prompted to cause a difference between movements of another subject shown in the captured image and the user to be clear. Accordingly, when a subject moving out of the defined normal range is detected from the captured image, it is possible for the specification unit 114 to specify the subject as the user.

FIG. 9 is a diagram illustrating a display example of the portable terminal 20 when the user specification is failed. For example, when the user is not specified by the specification unit 114, the display control unit 160 may control the portable terminal 20 such that information prompting the user to move the portable terminal 20 is displayed as information indicating the movement of the user necessary to specify the user in the portable terminal 20. For example, as shown in FIG. 9, the display control unit 160 may control the portable terminal 20 such that a message M4 of "Please move your portable terminal" is displayed as the information prompting the user to move the portable terminal 20 in the portable terminal 20.

As described above, according to the user specification function of the information processing device 10, user specification is tried from the captured image based on the parameter associated with the user of the portable terminal, and the display control unit 160 controls the portable terminal 20 such that information indicating the movement of the user necessary to specify the user is displayed in the portable terminal 20 when the user is not specified. Therefore, the user is expected to be easily specified from the captured image.

2. COMPOSITION DECISION FUNCTION

Next, the composition decision function of the information processing device 10 will be described. FIG. 10 is a diagram illustrating a brief overview of the composition decision function of the information processing device 10. As described above, when the capture image is captured by the imaging device 30, the captured image is displayed in the portable terminal 20 of the user. It is possible for the user to view the captured image displayed in the portable terminal 20. A scene in which the user moves toward the destination while viewing the captured image is assumed herein. Decision on a preferred composition as the captured image viewed by the user will be described.

First, information indicating the destination of the user is assumed. The information indicating the destination of the user may be input by the user operation input to the portable terminal 20, and may be set by an application run by the portable terminal 20. For example, the information indicating the destination of the user is depicted at a position in the real space. The information indicating the destination of the user is acquired by the information processing device 10. The composition decision unit 125 decides the composition based on the information indicating the destination of the user and the recognition result of the user based on the captured image acquired by the image acquisition unit 111. The composition is a diagram illustrating an ideal position of an object in the image (or an ideal direction of the object).

The recognition result of the user includes at least the user position in the real space and the travelling direction of the user. For example, the recognition result of the user is acquired by the recognition unit 121. In other words, the recognition unit 121 obtains the recognition result by recognizing the user based on the captured image. In the example shown in FIG. 10, the user position in the real space is denoted as Pu, the travelling direction of the user is denoted as V1, and the direction of the destination of the user using the user position Pu as a reference is denoted as V2.

For example, when the user position is recognized as the recognition result, the composition decision unit 125 may decide the composition based on the direction of the destination of the user using the user position as a reference. For example, in the example shown in FIG. 10, the composition decision unit 125 may decide the composition based on the direction V2 of the destination of the user using the user position Pu as the reference. For example, when the composition is decided based on V2, the composition decision unit 125 may decide the image in which a region in the direction V2 using the user position Pu as the reference is included to be larger than a region in a direction opposite to the direction V2 using the user position Pu as the reference as the composition. An example of the composition as decided above is shown as K2 in FIG. 10. The point C2 indicates a middle point of the composition K2.

In addition, for example, when the travelling direction of the user is recognized as the recognition result, the composition decision unit 125 may decide the composition based on the travelling direction of the user. For example, in the example shown in FIG. 10, the composition decision unit 125 may decide the composition based on the travelling direction V1 of the user. For example, when the composition is decided based on V1, the composition decision unit 125 may decide the image in which a region in the direction V1 using the user position Pu as the reference is included to be larger than a region in a direction opposite to the direction V1 using the user position Pu as the reference as the composition. An example of the composition as decided above is shown as K1 in FIG. 10. The point C1 indicates a middle point of the composition K1.

The composition decision unit 125 may uniformly decide the composition based on the travelling direction V1 of the user, may uniformly decide the composition based on the direction V2 of the destination of the user using the user position Pu as the reference, or may selectively use any of the decision techniques mentioned above. In other words, when a mode in which the composition is decided based on the travelling direction V1 of the user is a first mode and a mode in which the composition is decided based on the direction V2 of the destination of the user using the user position Pu as the reference is a second mode, the mode setting unit 124 may set any of these two modes. In this case, the composition decision unit 125 may decide the composition in accordance with the mode set by the mode setting unit 124. The mode may be set based on the user operation input to the portable terminal 20, or may be set by an application run by the portable terminal 20.

The image determination unit 126 determines the display image based on the composition decided by the composition decision unit 125. For example, the image determination unit 126 may determine an image in conformity with the composition decided by the composition decision unit 125 as the display image, or may determine an image closest to the composition decided by the composition decision unit 125 within the selectable range as the display image. The display control unit 160 controls the portable terminal 20 such that the display image determined by the image determination unit 126 is displayed in the portable terminal 20.

FIG. 11 is a diagram illustrating a display image at the time of setting the first mode. For example, when the captured image Img is acquired as shown in FIG. 10 and the first mode is set by the mode setting unit 124, the composition K1 is decided based on the travelling direction V1 of the user. In this case, for example, as shown in FIG. 11, the image determination unit 126 may determine an image in conformity with the composition K1 as the display image D1. In addition, the composition decision unit 125 may decide the composition in which the user is present in the middle. As shown in FIG. 11, the composition in which the user is present at a position spaced a predetermined distance d1 from the middle may be decided.

In addition, a current capturing condition may be decided. In other words, the condition decision unit 122 may decide whether or not the condition for capturing the user is prepared, and the information addition unit 123 may add information indicating that the condition is not prepared to the display image when the condition decision unit 122 decides that the condition is not prepared. For example, when a region capable of being captured is decided by the condition decision unit 122, the information addition unit 123 may add an object indicating a boundary of the region capable of being captured to the display image.

In addition, when the boundary of the region capable of being captured in the travelling direction V1 of the user using the user position Pu as the reference is decided by the condition decision unit 122, the information addition unit 123 may add an object indicating the boundary of the region capable of being captured to the display image. Since the boundary of the region capable of being captured in the travelling direction V1 of the user using the user position Pu as the reference has been decided in FIG. 11, the object indicating the boundary of the region capable of being captured is added to the display image D1 as A1. Alternatively, when the condition decision unit 122 decides that a distance between the user position Pu and the boundary of the region capable of being captured is shorter than a threshold, the information addition unit 123 may add the object indicating the boundary of the region capable of being captured to the display image.

In addition, when the condition decision unit 122 decides that the brightness of the captured image is less than a threshold, the information addition unit 123 may add an object indicating deterioration of the capturing condition to the display image. Although prompting the user to change the travelling direction is possible by virtue of such a process, the information provided to the user is not limited to the added object. For example, the information addition unit 123 may control the portable terminal 20 to vibrate, and may control the portable terminal 20 to generate an alarm tone.

FIG. 12 is a diagram illustrating a display image at the time of setting the second mode. For example, when the captured image Img is acquired as shown in FIG. 10 and the second mode is set by the mode setting unit 124, the composition K2 is decided based on the direction V2 of the destination of the user using the user position Pu as the reference. In this case, for example, as shown in FIG. 12, the image determination unit 126 may determine an image in conformity with the composition K2 as the display image D2. In addition, although the composition decision unit 125 decides the composition in which the user is present in the middle, the composition decision unit may decide the composition in which the user is present at a position spaced a predetermined distance d2 from the middle as shown in FIG. 12.

So far, the image determination unit 126 has used the technique of determining the display image by cutting out a portion of the captured image captured by the imaging device 30 based on the composition decided by the composition decision unit 125. When the imaging device 30 is one fixed camera, only the technique mentioned above is employed. However, when the imaging device 30 is a direction adjustable camera or an angle-of-view adjustable camera, or when the imaging device 30 is provided in a plural number, other techniques may be employed.

In this case, the fixed camera means a camera in which the capturing direction or the angle of view is not adjustable. The direction adjustable camera means a movable camera, and may be a camera having a pan function or a camera having a tilt function. The angle-of-view adjustable camera means a camera capable of changing the angle of view. FIG. 13 is a diagram illustrating a variation of a technique of determining the display image. As shown in FIG. 13, when the capturing camera 30 is the fixed camera, the image determination unit 126 employs the technique of determining the region selected from the captured image as the display image.

In addition, as shown in FIG. 13, when the imaging device 30 is the direction adjustable camera, the image determination unit 126 determines the capturing direction of the imaging device 30 that provides the captured image, and determines the captured image captured in the determined capturing direction as the display image. For example, the image determination unit 126 determines the capturing direction of the imaging device 30 based on the composition decided by the composition decision unit 125. In particular, the image determination unit 126 may determine the direction in which an image closest to the composition decided by the composition decision unit 125 can be captured as the capturing direction of the imaging device 30.

In addition, as shown in FIG. 13, when the imaging device 30 is the angle-of-view adjustable camera, the image determination unit 126 determines the angle of view of the imaging device 30 that provides the captured image, and determines the captured image captured at the determined angle of view as the display image. For example, the image determination unit 126 determines the angle of view of the imaging device 30 based on the composition decided by the composition decision unit 125. In particular, the image determination unit 126 may determine the angle of view at which an image closest to the composition decided by the composition decision unit 125 can be captured as the angle of view of the imaging device 30.

In addition, as shown in FIG. 13, when captured images provided from the respective imaging devices 30 are acquired by the image acquisition unit 111, the image determination unit 126 determines the captured image selected from the captured images provided from the respective imaging devices 30 as the display image. For example, the image determination unit 126 determines the captured image selected from the captured images provided from the respective imaging devices 30 as the display image based on the composition decided by the composition decision unit 125. In particular, the image determination unit 126 may select the captured image closest to the composition decided by the composition decision unit 125 from the captured images provided from the respective imaging devices 30, and may determine the selected captured image as the display image.

In addition, in the example described above, the image closest to the composition decided by the composition decision unit 125 is used as the display image. However, when only an image having a difference exceeding a threshold between the image and the composition is acquired, the display image may not be determined. In this case, it is also assumed that it is difficult for the image determination unit 126 to determine the display image based on the composition decided by the composition decision unit 125. Accordingly, in such a case, the image determination unit 126 may determine the display image based on detection data other than the composition.

The detection data is not particularly limited. For example, it is possible for the image determination unit 126 to determine an image in which a position closest to the user position specified by the specification unit 114 based on the sensor data is captured as the display image. In addition, the image determination unit 126 may determine an image having the smallest number of persons shown in the image as the display image, or may determine an image having the smallest density of persons shown in the image as the display image. Further, the image determination unit 126 may determine an image in which the largest range is captured as the display image, or may determine the captured image that is most frequently used as the display image.

In addition, when the imaging device 30 is not present or the like, it is also assumed that the captured image is not acquired by the image acquisition unit 111. In such a case, the image determination unit 126 may determine an image according to information indicating the destination of the user and the user position detected based on data other than the captured image as the display image.

For example, when position information of the user is acquired based on the signal received by a sensor receiving GPS signals, the image determination unit 126 may use the position information and information indicating the destination of the user to search an image from a web page or the like. The image may be a plotted map, or may be a captured photograph. In addition, when plural images are acquired by searching, the image determination unit 126 may determine a new image generated by synthesizing a plurality of images as the display image.

FIG. 14 is a diagram illustrating an example of the determined display image. As shown in FIG. 14, the display control unit 160 may add an object Obj1 indicating a distance from the user position Pu as a reference to the destination of the user, an object Obj2 indicating an estimated time of arriving in the destination and a distance to the destination, and so forth, to the display image D2.

In addition, as shown in FIG. 14, the display control unit 160 may add an object Obj3 indicating a bearing, an object Obj4 indicating a direction of the destination of the user using the user position Pu as the reference, and so forth, to the display image D2. In addition, as shown in FIG. 14, the display control unit 160 may add an object Obj5 indicating a direction of the destination of the user using the user position Pu as the reference to the user position Pu and may add an object Obj6 indicating the user position Pu to a position of the user in the display image D2.

Next, a flow of the composition decision operation of the information processing device 10 will be described. FIG. 15 is a flowchart illustrating the flow of the composition decision operation of the information processing device 10. As shown in FIG. 15, when the captured image is not acquired by the image acquisition unit 111 ("No" in step S21), the recognition unit 121 recognizes the user from data other than the captured image (step S22), and the flow proceeds to step S26.

On the other hand, when the captured image is acquired by the image acquisition unit 111 ("Yes" in step S21), the recognition unit 121 recognizes the user from the captured image (step S23), and the condition decision unit 122 decides whether or not a condition for capturing is prepared (step S24). When the condition decision unit 122 decides that the condition for capturing is prepared ("Yes" in step S24), the flow proceeds to step S26. On the other hand, when the condition decision unit 122 decides that the condition for capturing is not prepared ("No" in step S24), the information addition unit 123 adds information indicating that the condition is not prepared to the captured image (step S25), and the flow proceeds to step S26.

When the flow proceeds to step S26, the mode setting unit 124 sets any one of the first mode and the second mode (step S26), and the composition decision unit 125 decides the composition in accordance with the mode set by the mode setting unit 124 based on the recognition result of the recognition unit 121 (step S27). The image determination unit 126 then tries to determine the display image based on the composition decided by the composition decision unit 125 (step S28).

In this case, when the display image is determined by the image determination unit 126 ("Yes" in step S29), the flow proceeds to step S31. On the other hand, when the display image is not determined by the image determination unit 126 ("No" in step S29), the image determination unit 126 determines the display image based on detection data other than the composition (step S30), and the flow proceeds to step S31. The display control unit 160 controls the portable terminal 20 such that the display image determined by the image determination unit 126 is displayed in the portable terminal 20 (step S31), and the flow is finished.

As described above, according to the composition decision function of the information processing device 10, the composition is decided based on information indicating the destination of the user and the recognition result of the user based on the captured image. In addition, the display image is determined based on the determined composition. In accordance with such control, the display image having higher convenience is expected to be determined for the user.

3. DEPICTION CHANGE FUNCTION

Next, the depiction change function of the information processing device 10 will be described. As described above, it is assumed that the information processing device 10 provides a network service and the network service is provided to the portable terminal 20 when the user U logs into the network service via the portable terminal 20.

Logging into the network service is not limited to the user U, and may be performed by another user. In other words, there is a possibility that a person shown in the captured image (hereinafter, also referred to as a subject) enjoy the network service. Hereinafter, a function of easily finding the change in state in the network service of the subject shown in the captured image will be described. In addition, the subject shown in the captured image may be recognized by the recognition unit 121 using the same technique as the technique specified by the user.

The change detection unit 131 detects the change in state in the network service of the subject recognized from the captured image acquired by the image acquisition unit 111. The state in the network service is not particularly limited. For example, the state may be information indicating whether or not the portable terminal of the subject logs into the network service. In other words, when the change detection unit 131 detects that the portable terminal of the subject has logged into the network service, the depiction change unit 132 may change the depiction of the subject shown in the captured image.

In addition, the state in the network service may be information indicating whether or not a specific process is carried out while being logged into the network service. In other words, when the change detection unit 131 detects that the movement in the network service of the portable terminal of the subject satisfies a predetermined condition, the depiction change unit 132 may change the depiction of the subject shown in the captured image. The predetermined condition is not particularly limited. For example, the predetermined condition may be a condition that a message was written, and may be a condition that the message was written within a predetermined time.

When the change in state is detected by the change detection unit 131, the depiction change unit 132 changes the depiction of the subject shown in the captured image. A region of the subject shown in the captured image may be figured out in any way by the depiction change unit 132. For example, when a difference between the captured image in which the subject is not shown and the captured image in which the subject is shown occurs, the differential region therebetween may be found as the region of the subject. In addition, a method of changing the depiction of the subject is not particularly limited.

Further, when the user is specified by the specification unit 114, the depiction change unit 132 may change the depiction of the user by emphasizing the user shown in the captured image. In addition, a method of emphasizing the user is not particularly limited. The display control unit 160 controls the portable terminal 20 such that the display image that may be obtained by causing the depiction change unit 132 to change the depiction is displayed in the portable terminal 20.

Techniques of emphasizing the user will be described with reference to drawings. FIG. 16 is a diagram illustrating an example of the depiction change function of the information processing device 10. As shown in FIG. 16, the depiction change unit 132 may emphasize the user U by decreasing the definition of subjects other than the user U in the captured image.

FIG. 17 is a diagram illustrating another example of the depiction change function of the information processing device 10. As shown in FIG. 17, the depiction change unit 132 may emphasize the user U by emphasizing an outline L1 of the user U in the captured image. For example, the user U may be emphasized by making the outline L1 of the user U thick in the captured image.

FIG. 18 is a diagram illustrating another example of the depiction change function of the information processing device 10. As shown in FIG. 18, the depiction change unit 132 may emphasize the user U by changing the pixel value of subjects other than the user U in the captured image. For example, the user U may be emphasized by decreasing the brightness of subjects other than the user U in the captured image.

FIG. 19 is a diagram illustrating another example of the depiction change function of the information processing device 10. As shown in FIG. 19, the depiction change unit 132 may emphasize the user U such that the user U is zoomed in on and displayed in the captured image. In addition, as shown in FIG. 19, the depiction change unit 132 may zoom out and display the user U after the zoom-in display is carried out.

FIG. 20 is a diagram illustrating another example of the depiction change function of the information processing device 10. The depiction change unit 132 may emphasize the user by displaying an object at a position of the user or a position near the user in the captured image. The range of surrounding the user may be defined in advance. In the example shown in FIG. 20, the depiction change unit 132 emphasizes the user U by adding objects Obj8 and Obj9 to the position around the user in the captured image.

In addition, the degree of emphasizing the user U may be constant, or may be changed depending on the situation. For example, the depiction change unit 132 may change the degree of emphasizing the user in accordance with the size of the user in the captured image. FIG. 21 is a diagram illustrating another example of the depiction change function of the information processing device 10. For example, the depiction change unit 132 may increase the degree of emphasizing the user to the same extent to which the size of the user in the captured image decreases.

In the example shown in FIG. 21, as the position of the user U is farther from the imaging device 30, the size of the user U in the captured image is smaller. Therefore, the depiction change unit 132 increases the degree of emphasizing the user U having a small size by making the outline L0 of the user U having the small size thicker than the outline L1 of the user U having a large size. In this way, it is easier to find the user in the captured image by increasing the degree of emphasizing the user to the same extent to which the size of the user in the captured image decreases.

In addition, the user U may be hidden behind other objects in the captured image. For example, when a portion of the user or the entire user is hidden and shown by other objects in the captured image, the depiction change unit 132 may change the technique of emphasizing the user. FIG. 22 is a diagram illustrating another example of the depiction change function of the information processing device 10. As shown in FIG. 22, a portion of the user U is hidden by other subjects in the captured image. The depiction change unit 132 thus changes the technique of emphasizing the user U by adding the object Obj10 to a position around the user U in the captured image. The range of surrounding the user U may be defined in advance.

Next, a flow of depiction change operations of the information processing device 10 will be described. FIG. 23 is a flowchart illustrating the flow of the depiction change operations of the information processing device 10. As shown in FIG. 23, when the captured image is not acquired by the image acquisition unit 111 ("No" in step S41), the flow is finished. On the other hand, when the captured image is acquired by the image acquisition unit 111 ("Yes" in step S41), the subject is recognized from the captured image by the recognition unit 121 (step S42). The change detection unit 131 then decides whether or not the change in state of the subject in the network service is detected (step S43).

When the change in state of the subject in the network service is not detected by the change detection unit 131 ("No" in step S43), the flow is finished. On the other hand, when the change in state of the subject in the network service is detected by the change detection unit 131 ("Yes" in step S43), the depiction change unit 132 changes the depiction of the subject (step S44). The display control unit 160 controls display of the display image that may be obtained by the depiction change unit 132 that changes the depiction (step S45), and the flow is finished.

As described above, according to the depiction change function of the information processing device 10, the change in state in the network service of the subject recognized from the captured image is detected. In addition, when the change in state is detected, the depiction of the subject shown in the captured image is changed. According to such control, the change in state in the network service of the subject shown in the captured image is expected to be easily found.

4. CONCLUSION

As described above, according to the user specification function of the information processing device 10 of the present embodiment, the information processing device 10 including the image acquisition unit 111 that acquires the captured image, the parameter acquisition unit 112 that acquires the parameter associated with the user of the portable terminal 20, the specification unit 114 that specifies the user from the captured image based on the parameter, and the display control unit 160 that control the portable terminal such that information indicating the movement of the user necessary to specify the user is displayed in the portable terminal 20 when the user is not specified by the specification unit 114 is provided.

According to the configuration described above, when the user is not specified by the specification unit 114, the information indicating the movement of the user necessary to specify the user is displayed by the portable terminal 20, and the user who has viewed the information can move so as to specify the user from the captured image. Accordingly, the user is expected to be easily specified from the captured image.

In addition, according to the composition decision function of the information processing device 10 of the present embodiment, the information processing device 10 including the image acquisition unit 111 that acquires the captured image, the composition decision unit 125 that decides the composition based on information indicating the destination of the user and the recognition result of the user based on the captured image, and the image determination unit 126 that determines the display image based on the composition decided by the composition decision unit 125 is provided.

According to such a configuration, the composition is decided based on the information indicating the destination of the user and the recognition result of the user based on the captured image, and the display image is determined based on the composition. For example, the composition is decided based on information indicating the user position and information indicating the destination by the composition decision unit 125. Accordingly, the display image having higher convenience is expected to be determined for the user.

In addition, according to the depiction change function of the information processing device 10 of the present embodiment, the information processing device 10 including the image acquisition unit 111 that acquires the captured image, the change detection unit 131 that detects the change in state in the network service of the subject recognized from the captured image, and the depiction change unit 132 that changes the depiction of the subject shown in the captured image when the change in state is detected by the change detection unit 131 is provided.

According to such a configuration, when the change in state of the subject in the network service is detected, the depiction of the subject shown in the captured image is changed. It is possible for the user who has viewed the captured image to easily find the change in state of the subject in the network service from the captured image.

It should be understood by those skilled in the art that various modifications, combinations, sub-combinations and alterations may occur depending on design requirements and other factors insofar as they are within the scope of the appended claims or the equivalents thereof.

In addition, for example, an example in which the information processing device 10 includes all of the processing control unit 100 and the display control unit 160 has been described. However, a device other than the information processing device 10 may have a portion of the blocks or the entire blocks. For example, a server may have a portion of the processing control unit 100 and the display control unit 160 and the portable terminal 20 may have the remaining portion. In this way, the technique of the present disclosure can also be applied to cloud computing.

In addition, it is not necessary for each step in operations of the information processing device 10 of the present specification to be processed in a time series in the order described in the flowchart. For example, each step in the operations of the information processing device 10 may be processed in an order different from the order described in the flowchart, or may be processed in parallel.

In addition, it is possible to create a computer program causing hardware such as a CPU, a ROM, and a RAM embedded in the information processing device 10 to exert the same function as the configuration of the information processing device 10 described above. In addition, a storage medium in which the computer program is stored is also provided.

Additionally, the present technology may also be configured as below.

(1) An information processing device including an image acquisition unit configured to receive an image; a recognition unit configured to acquire a recognition result of a user based on the received image, wherein the recognition result includes a position of the user, the user being associated with a display terminal; an image determination unit configured to determine an object based on the recognition result; and a display control unit configured to control display of the object on the display terminal.

(2) The information processing device according to (1), further including a composition decision unit configured to determine a composition of content for display on the display terminal based on the recognition result.

(3) The information processing device according to (2), wherein the composition decision unit is configured to determine the composition of content based on information indicating a destination of the user.

(4) The information processing device according to (2), wherein the composition decision unit is configured to determine the composition of content based on a detected direction of movement of the user.

(5) The information processing device according to (1), further including an information addition unit configured to add to the received image an indication of a boundary of a region capable of being captured.

(6) The information processing device according to (1), wherein the image acquisition unit is configured to capture the image.

(7) The information processing device according to (1), wherein the image acquisition unit is configured to receive the image from an external device.

(8) The information processing device according to (1), wherein the recognition result includes an identity of the user.

(9) The information processing device according to (1), wherein the recognition result includes personal information associated with the user.

(10) The information processing device according to (1), wherein the object is not part of the received image.

(11) The information processing device according to (1), wherein the object is a message.

(12) The information processing device according to (1), wherein the object provides information associated with a destination of the user.

(13) The information processing device according to (1), wherein the display control unit controls display of the received image on the display terminal.

(14) A method for processing information, the method including receiving an image; acquiring a recognition result of a user based on the received image, wherein the recognition result includes a position of the user, the user being associated with a display terminal; determining an object based on the recognition result; and controlling display of the received image and the object on the display terminal.

(15) The method according to (14), wherein the recognition result includes an identity of the user.

(16) The method according to (14), wherein the recognition result includes personal information associated with the user.

(17) The method according to (14), wherein the object is not part of the received image.

(18) The method according to (14), wherein the object is a message.

(19) The method according to (14), wherein the object provides information associated with a destination of the user.

(20) A system including a display terminal associated with a user; a image capturing device configured to capture an image; and an information processing device coupled to the display terminal and the image capturing device, the information processing device including an image acquisition unit configured to receive the image from the image capturing device; a recognition unit configured to acquire a recognition result of the user based on the received image, wherein the recognition result includes a position of the user; an image determination unit configured to determine an object based on the recognition result; and a display control unit configured to control display of the received image and the object on the display terminal.

(21) An information processing device including:
an image acquisition unit configured to acquire a captured image;
a composition decision unit configured to decide a composition based on a recognition result of a user based on the captured image and information indicating a destination of the user; and
an image determination unit configured to determine a display image based on the composition decided by the composition decision unit.

(22) The information processing device according to (21), further including: a display control unit configured to control the display image determined by the image determination unit to be displayed in a portable terminal.

(23) The information processing device according to (21) or (22), wherein, when a position of the user is recognized as the recognition result, the composition decision unit decides the composition based on a direction of the destination of the user using the position of the user as a reference.

(24) The information processing device according to (21) or (22), further including: a mode setting unit configured to set any one of a first mode in which the composition is decided based on a direction of movement of the user and a second mode in which the composition is decided based on a direction of the destination of the user using a position of the user as a reference, wherein the composition decision unit decides the composition in accordance with the mode set by the mode setting unit.

(25) The information processing device according to any one of (21) to (4), wherein, when a position of the user is recognized as the recognition result, the composition decision unit decides the composition in which the user is present at a center or a position a predetermined distance away from the center.

(26) The information processing device according to any one of (21) to (25), wherein, when captured images provided from a respective plurality of imaging devices are acquired by the image acquisition unit, the image determination unit determines a captured image selected among the captured images provided from the respective plurality of imaging devices as the display image.

(27) The information processing device according to any one of (21) to (25), wherein the image determination unit determines a capturing direction of an imaging device that provides a captured image, and determines a captured image captured in the determined capturing direction as the display image.

(28) The information processing device according to any one of (21) to (25), wherein the image determination unit determines an angle of view of an imaging device that provides a captured image, and determines a captured image captured at the determined angle of view as the display image.

(29) The information processing device according to any one of (21) to (25), wherein the image determination unit determines a region selected from the captured image as the display image.

(30) The information processing device according to any one of (21) to
(25), wherein the image determination unit determines the display image based on detection data other than the composition when the image determination unit is incapable of determining the display image based on the composition decided by the composition decision unit.

(31) The information processing device according to (21) or (22), wherein, when the captured image is not acquired by the image acquisition unit, the image determination unit determines an image according to the information indicating the destination of the user and a position of the user detected based on data other than the captured image as the display image.

(32) The information processing device according to any one of (21) to (30), further including:
a recognition unit configured to obtain the recognition result by recognizing the user based on the captured image.

(33) The information processing device according to any one of (21) to (32), further including:
a condition decision unit configured to decide whether or not a condition for capturing the user is prepared; and
an information addition unit configured to add information indicating that the condition is not prepared to the display image when the condition decision unit decides that the condition is not prepared.

(34) An information processing method including:
acquiring a captured image;
deciding a composition based on a recognition result of a user based on the captured image and information indicating a destination of the user; and
determining a display image based on the composition.

(35) A program for causing a computer to function as an information
processing device, the information processing device including:
an image acquisition unit configured to acquire a captured image;
a composition decision unit configured to decide a composition based on a recognition result of a user based on the captured image and information indicating a destination of the user; and
an image determination unit configured to determine a display image based on the composition decided by the composition decision unit.

REFERENCE SIGNS LIST

1 Information processing system
10 Information processing device
20 Portable terminal
30 Imaging device
40 Network
50 Storage unit
100 Processing control unit
111 Image acquisition unit
112 Parameter acquisition unit
113 Candidate extraction unit
114 Specification unit
115 Authentication unit
121 Recognition unit
122 Condition decision unit
123 Information addition unit
124 Mode setting unit
125 Composition decision unit
126 Image determination unit
131 Change detection unit
132 Depiction change unit
160 Display control unit

What is claimed is:
1. An information processing system, comprising:
a portable terminal including a display;
a mobile object including
an imaging device configured to capture an image, and
an actuator to move the mobile object; and
circuitry configured to:
determine a position of a specific subject related to the portable terminal based on the captured image;
send the captured image and information on the determined position of the specific subject to the portable terminal;
determine a first virtual object based on the determined position of the specific subject; and
control the display to display the first virtual object over the captured image to indicate the determined position of the specific subject.
2. The information processing system according to claim 1,
the portable terminal includes a touch panel configured to receive a touch operation and is configured to send, to the circuitry, data of a position of the touch operation in the captured image, and
the circuitry is configured to determine the position of the subject related to the portable terminal based on the position of the touch operation in the captured image.
3. The information processing system according to claim 1, wherein the circuitry is configured to:

determine whether there is a first subject performing a larger movement than a movement of a second subject in the captured image; and determine the position of the specific subject based on a position of the first subject, when it is determined that there is the first subject performing the larger movement in the captured image.

4. The information processing system according to claim 1, wherein the circuitry is configured to:

determine a travelling direction of the specific subject based on the captured image; and change a composition of the captured image based on the determined position of the specific subject and the determined travelling direction of the specific subject.

5. The information processing system according to claim 4, wherein the imaging device is a movable camera configured to change a capturing direction in at least one of a pan direction or a tilt direction, and the circuitry is configured to actuate the movable camera to change the composition of the captured image, based on the determined position of the specific subject and the determined travelling direction of the specific subject.

6. The information processing system according to claim 4, wherein the circuitry is configured to change the composition of the captured image such that a first displayed region of the captured image corresponding to the travelling direction becomes larger than a second displayed region of the captured image corresponding to a direction opposite to the traveling direction.

7. The information processing system according to claim 1, wherein the circuitry is configured to:

determine whether the specific subject is hidden behind at least one subject different from the specific subject in the captured image; and control the display to display a second virtual object different from the first virtual object to emphasize the position of the specific subject in the captured image.

8. The information processing system according to claim 1, wherein the circuitry is configured to control the imaging device to zoom-out the position of the specific subject after the position of the specific subject is zoomed-in when the position of the specific subject is determined.

9. The information processing system according to claim 1, wherein the first virtual object is a message object including instruction to move the specific subject.

10. A method for controlling an information processing system including a portable terminal and a mobile object, the method comprising:

connecting the portable terminal with the mobile object wirelessly;

determining a position of a specific subject related to the portable terminal based on an image captured by the mobile object;

sending the captured image and information on the determined position of the specific subject to the portable terminal;

determining a virtual object based on the determined position of the specific subject; and controlling a display of the portable terminal to display the virtual object over the captured image to indicate the determined position of the specific subject.

11. At least one non-transitory computer-readable medium encoded with instructions which, when executed by at least one of a portable terminal, a mobile object, and a network server, causes a combination of the portable terminal and the mobile object to:

connect the portable terminal with the mobile object wirelessly;

determine a position of a specific subject related to the portable terminal based on an image captured by the mobile object;

send the captured image and information on the determined position of the specific subject to the portable terminal;

determine a virtual object based on the determined position of the specific subject; and control a display of the portable terminal to display the virtual object over the captured image to indicate the determined position of the specific subject.

* * * * *